United States Patent [19]
Nakadate et al.

[11] Patent Number: 5,655,633
[45] Date of Patent: Aug. 12, 1997

[54] HYDRAULIC DAMPER OF A DAMPING FORCE ADJUSTING TYPE

[75] Inventors: Takao Nakadate; Akira Kashiwagi, both of Kanagawa-ken; Takashi Nezu, Tokyo; Chigaya Sekine, Kanagawa-ken, all of Japan

[73] Assignee: Tokico Ltd., Kawasaki, Japan

[21] Appl. No.: 444,916

[22] Filed: May 19, 1995

[30] Foreign Application Priority Data

| May 20, 1994 | [JP] | Japan | 6-131028 |
| May 31, 1994 | [JP] | Japan | 6-141155 |
| Mar. 20, 1995 | [JP] | Japan | 7-087600 |

[51] Int. Cl.[6] .................................................. F16F 9/46
[52] U.S. Cl. .................... 188/299; 188/318; 188/322.13; 280/714
[58] Field of Search ........................ 188/299, 322.11, 188/322.13, 322.19, 297, 318, 279, 280, 282; 280/707, 709, 714

[56] References Cited

U.S. PATENT DOCUMENTS 5,328,004  7/1994  Fannin et al. .................... 188/299 X

FOREIGN PATENT DOCUMENTS

| 155242 | 7/1987 | Japan. | |
| 145443 | 6/1989 | Japan | 188/299 |

Primary Examiner—Peter M. Poon
Attorney, Agent, or Firm—Wenderoth, Lind & Ponack

[57] ABSTRACT

A piston connected to a piston rod is slidably mounted in a cylinder, and a lower cylinder chamber is connected to a reservoir. An extension side passage for communicating an upper cylinder chamber with the lower cylinder chamber and a compression side passage for communicating the cylinder chamber with the reservoir are provided with disc valves, respectively, behind which extension side and compression side back pressure chambers are formed. The extension side back pressure chamber is communicated with the upper and lower cylinder chambers through a fixed orifice and ports. The compression side back pressure chamber is communicated with the lower cylinder chamber and the reservoir through a fixed orifice and ports. By rotating a shutter, flow areas of the ports are changed to adjust orifice features and pressures in the extension side and compression side back pressure chambers are changed to adjust valve features.

19 Claims, 19 Drawing Sheets

HYDRAULIC DAMPER OF A DAMPING FORCE ADJUSTING TYPE

BACKGROUND THE INVENTION

1. Field of the Invention

The present invention relates to a hydraulic damper of a damping force adjusting type used with a suspension apparatus for a vehicle such as a motor vehicle.

2. Related Background Art

Among hydraulic dampers mounted in a suspension apparatus for a vehicle such as a motor vehicle, there are hydraulic dampers of a damping force adjusting type capable of suitably adjusting a damping force to improve riding comfort and/or steering stability in dependence upon a road surface condition and a vehicle running condition.

Generally, in such hydraulic dampers of damping force adjusting type, a cylinder containing hydraulic liquid is divided into two cylinder chambers by a piston slidably received within the cylinder and connected to a piston rod, and a main liquid passage and a bypass passage are formed in the piston to communicate the two cylinder chambers with each other. In this case, a damping force generating mechanism comprising an orifice and a disc valve is provided in association with the main liquid passage, and a damping force adjusting valve for adjusting a flow area of the bypass passage is provided in association with the bypass passage. A reservoir is connected to one of the cylinder chambers to compensate for change in the volume of the chambers due to extension and retraction of the piston rod by the compression and expansion of gas.

When the bypass passage is opened through the damping force adjusting valve, flow resistance of the hydraulic liquid flowing between the two cylinder chambers is reduced, thereby decreasing the damping force. Whereas, when the bypass passage is closed, the flow resistance of the hydraulic liquid flowing between the two cylinder chambers is increased, thereby increasing the damping force. In this way, the damping force can be adjusted by opening and closing the damping force adjusting valve.

However, in the hydraulic dampers wherein the damping force is adjusted by adjusting the flow area of the bypass passage, when the piston is moved at a low speed, since the damping force depends upon a feature of the orifice in the liquid passage, the damping force can be changed at a large rate. But, when the piston is moved at an intermediate or high speed, since the damping force depends upon the damping force generating mechanism (disc valve) of the main liquid passage, the damping force cannot be changed at a large rate.

To avoid this, as disclosed in the Japanese Utility Model Laid-open No. 62-155242 (1987), there has been proposed a hydraulic damper wherein a pressure chamber is formed behind a disc valve constituting a damping force generating mechanism for a main liquid passage, and the pressure chamber is communicated with a cylinder chamber at an upstream side of the disc valve through a fixed orifice and is communicated with a cylinder chamber at a downstream side of the disc valve through a variable orifice.

In accordance with such a hydraulic damper of the damping force adjusting type, by opening and closing the variable orifice, a flow area between the two cylinder chambers can be adjusted and pressure in the pressure chamber can be changed to vary the initial pressure for opening the disc valve. In this way, the orifice feature and valve feature can be adjusted, thereby widening an adjusting range for the damping force feature.

However, in the above-mentioned conventional hydraulic dampers of the damping force adjusting type wherein the damping force generating mechanism and the damping force adjusting valve are provided in association with the piston, there arose the following problems. That is to say, if the flow resistance of the piston at a base valve disposed between the cylinder chamber and the reservoir is increased, since an amount of hydraulic liquid flowing into the reservoir is excessively increased during a compression stroke to generate negative pressure in one of the cylinder chambers, the stable damping force cannot be obtained. In this way, since the feature of the damping force of compression side depends upon the flow resistance of the base valve, an adjusting range for the damping force feature of compression side becomes narrower.

Further, since the size of the piston is increased, the stroke of the piston rod is decreased accordingly. In addition, since the damping force adjusting valve is normally actuated through an operation rod inserted in the piston rod, the freedom of design for an attachment portion of the piston rod to a vehicle body is limited.

In the hydraulic dampers of the damping force adjusting type, wherein the pressure chamber is formed behind the disc valve to adjust the opening degree of the disc valve, if the sealing ability for the pressure chamber is weak, the hydraulic liquid will leak from the pressure chamber to decrease the pressure in the chamber, with the result that the stable damping force cannot be obtained. In particular, in the case where a high damping force is set, when the piston is moved at a low speed, the hydraulic liquid is apt to leak, thereby decreasing the damping force.

SUMMARY OF THE INVENTION

The present invention aims to eliminate the above-mentioned conventional drawbacks, and an object of the present invention is to provide a hydraulic damper of damping force adjusting type which can widen an adjusting range for adjusting a damping force feature.

Another object of the present invention is to provide a hydraulic damper of damping force adjusting type which can improve sealing ability for a negative pressure chamber.

To achieve the above objects, a hydraulic damper of damping force adjusting type according to one aspect of the present invention comprises a cylinder containing hydraulic fluid therein, a piston slidably mounted in the cylinder and dividing the interior of the cylinder into two cylinder chambers, a piston rod having one end connected to the piston and the other end extending out of the cylinder, and a reservoir connected to the cylinder adapted to compensate for changes in volume of the cylinder due to extension and retraction of the piston rod by compression or expansion of gas. A damping force generating mechanism is disposed outside the cylinder. It comprises a passage of an extension side adapted to make the hydraulic fluid flow from one of the cylinder chambers to the other cylinder chamber during the extension stroke of the piston rod, a passage of a compression side adapted to make the hydraulic fluid flow from the cylinder chamber to the reservoir during the compression stroke of the piston rod, a damping valve of the extension side for adjusting a flow area of the extension side passage, a back pressure chamber of the extension side for applying pressure to a valve body of the extension side damping valve to close the valve, an upstream passage for communicating the extension side back pressure chamber with the cylinder chamber on the upstream side of the extension side damping valve with flow resistance, a downstream passage for communicating the extension side back pressure chamber with the cylinder chamber on the downstream side of the extension side damping valve, a variable orifice of the extension side for adjusting a flow area of the downstream passage, a damping valve of the compression side for adjusting a flow area of the compression side passage, a back pressure chamber of compression side for applying pressure to a valve body of the compression side damping valve to close the valve, an upstream passage for communicating the compression side back pressure chamber with the cylinder chamber on the upstream side of the compression side damping valve with flow resistance, a downstream passage for communicating the compression side back pressure chamber with the reservoir on the downstream side of the compression side damping valve, and a variable orifice of the compression side for adjusting a flow area of the downstream passage.

With this arrangement, during the extension stroke of the piston rod, the hydraulic fluid flows between the two cylinder chambers through the extension side passage and the passage at the upstream side and the downstream side of the extension side back pressure chamber, with the result that the damping force is generated by the extension side variable orifice and the extension side damping valve. Thus, by changing the flow area of the extension side variable orifice, the orifice feature can be changed, and the inner pressure in the extension side back pressure chamber can be changed to vary the valve opening feature of the extension side damping valve, thereby changing the valve feature. On the other hand, during the compression stroke of the piston rod, the hydraulic fluid I flows from the cylinder chamber to the reservoir through the compression side passage and the passage at the upstream side and the downstream side of the compression side back pressure chamber, with the result that the damping force is generated by the compression side variable orifice and the compression side damping valve. Thus, by changing the flow area of the compression side variable orifice, the orifice feature can be changed, and the inner pressure in the compression side back pressure chamber can be changed to vary the valve opening feature of the compression side damping valve, thereby changing the valve feature. In this case, since the damping force is generated by controlling the liquid flow area between the cylinder chamber and the reservoir during the compression stroke, the back pressure is not generated in the cylinder chambers due to the flow resistance of variable orifice and the damping valve, thereby obtaining a stable damping force.

According to another aspect of the present invention, there is provided a hydraulic damper of damping force adjusting type wherein a damping force is generated by controlling the flow of hydraulic fluid in two cylinder chambers of a cylinder containing the hydraulic fluid therein by a sliding movement of a piston slidably mounted in the cylinder and the damping force feature can be adjusted by adjusting a communication passage area between the two cylinder chambers. The damper comprises a disc valve for adjusting the communication passage area between the two cylinder chambers by opening the disc valve by pressure in one of two cylinder chambers, a substantially cylindrical seal member provided at its one inner end with an inwardly extending flange portion abutting against a back surface of the disc valve, a seal guide member having an outer periphery on which the other end of the seal member is slidably fitted, a disc-shaped leaf spring abutting against the flange portion of the seal member from the inside in a liquid-tight manner to urge the seal member against the disc valve and defining a back pressure chamber in the seal member, an upstream passage for communicating the back pressure chamber with the cylinder chamber on the upstream side of the disc valve, a downstream passage for communicating the back pressure chamber with the cylinder chamber on the downstream side of the disc valve, and a variable orifice for adjusting a flow area of the downstream passage.

With this arrangement, the damping force is generated by controlling the flow of the hydraulic fluid between the two cylinder chambers caused by the sliding movement of the piston in the cylinder by means of the disc valve and the variable orifice, and, by changing the flow area of the variable orifice, the orifice feature can be directly adjusted and the pressure in the back pressure chamber can be changed to vary the opening feature of the disc valve, thereby adjusting the valve feature. Further, since the leaf spring is urged against the flange portion of the seal member by the pressure in the back pressure chamber, the sealing ability between the leaf spring and the seal member can be improved.

DETAILED DESCRIPTION OF THE PREFERRED EMBODIMENTS

The present invention will now be explained in connection with embodiments thereof with reference to the accompanying drawings. Incidentally, in damping force generating mechanisms shown in FIGS. 1 to 6, an extension stroke is effected by the condition of the elements shown in the right half, and a compression stroke is effected by the condition shown in the left half.

Figure 1:
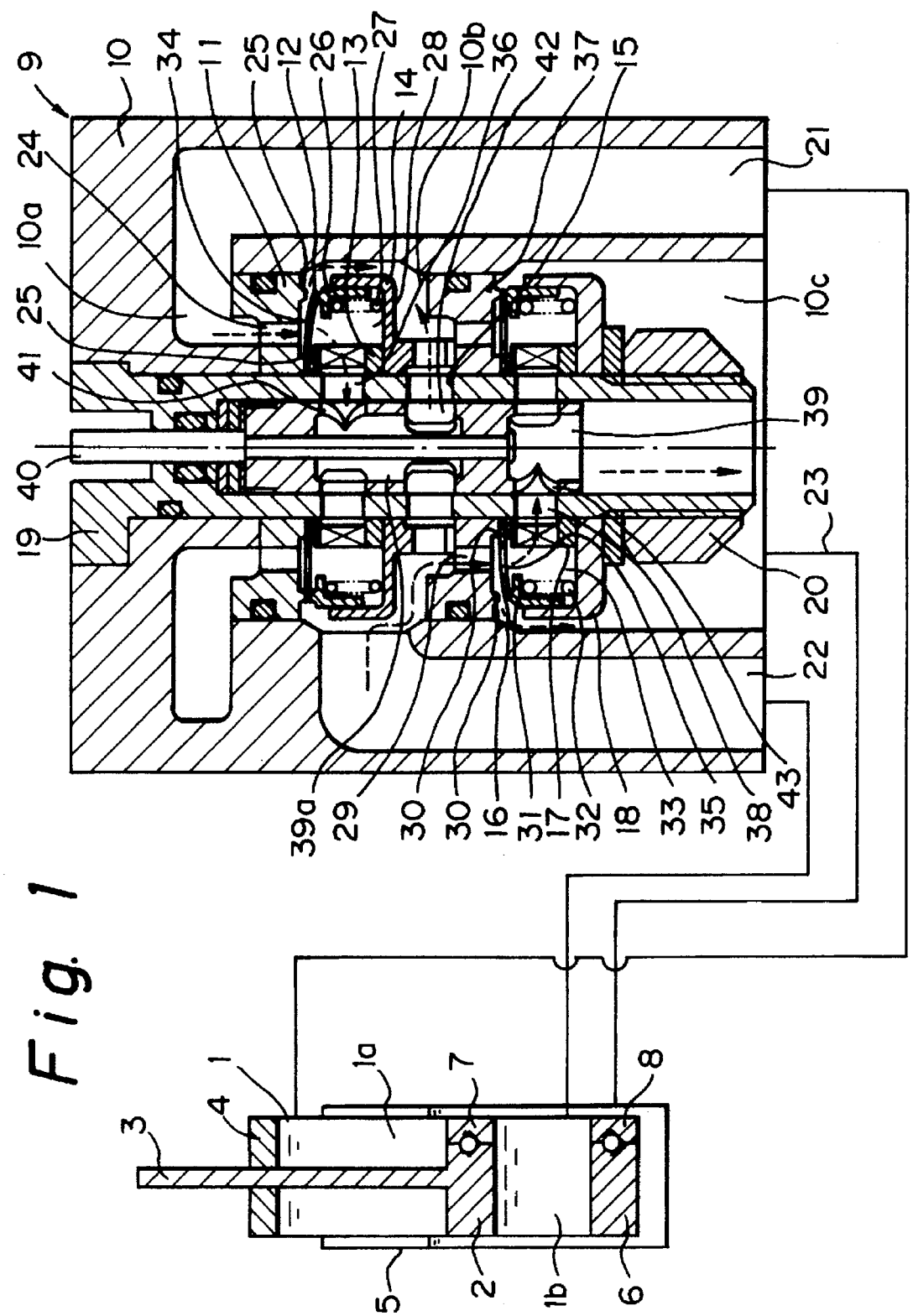
FIG. 1 is a sectional view of a hydraulic damper of a damping force adjusting type according to a first embodiment of the present invention.

First of all, the first embodiment of the present invention will be explained with reference to FIG. 1. As shown in FIG. 1, in a hydraulic damper of a damping force adjusting type according to the first embodiment, a piston 2 is slidably mounted within a cylinder 1 containing hydraulic liquid (for example, oil), and the interior of the cylinder is divided into an upper cylinder chamber 1a and a lower cylinder chamber 1b by the piston 2. One end of a piston rod 3 is connected to the piston 2 and the other end of the piston rod 3 extends out of the cylinder 1 through a guide seal 4 attached to one end of the cylinder. A reservoir 5 containing the hydraulic liquid and gas is disposed around the cylinder 1 in such a manner that the reservoir is communicated with the lower cylinder chamber 1b through a base valve 6 disposed on a bottom of the cylinder 1.

The piston 2 is provided with a check valve 7 for permitting only the oil flow from the lower cylinder chamber 1b to the upper cylinder chamber 1a, and the base valve 6 is provided with a check valve 8 for permitting only the oil flow from the reservoir 5 to the lower-cylinder chamber 1b. Further, a damping force generating mechanism 9 is provided in association with the cylinder 1.

In a damping force generating mechanism 9, within a substantially cylindrical case 10 having a base wall, an annular valve member 11 is disposed, and an annular valve member 15 is disposed below (FIG. 1) the valve member 11 with the interposition of a disc valve 12, a spacer 13 and a housing 14. Below the valve member 15, there are disposed a disc valve 16, a spacer 17 and a housing 18, in this order. These elements 11 18 are fixed around a substantially cylindrical guide member 19 having a base inserted into the mechanism through the base wall of the case 10 by tightening a nut 20 against the guide member 19 from below.

The valve members 11, 15 divide the interior of the case 10 into three oil chambers 10a, 10b and 10c. The case 10 is provided with an oil passage 21 for communicating the oil chamber 10a with the upper cylinder chamber 1a, an oil passage 22 for communicating the oil chamber 10b with the lower cylinder chamber 1b, and an oil passage 23 for communicating the oil chamber 10c with the reservoir 5.

The valve member 11 is provided with an extension side passage 24 for communicating the oil chamber 10a with the oil chamber 10b (i.e. communicating the upper and lower cylinder chambers 1a, 1b with each other through the oil passages 21, 22). Annular valve seats 25 are protruded from an end surface (which faces the oil chamber 10b) of the valve member 11 with an opening of the extension side passage 24 disposed between these seats, and a disc valve 12 acting as a damping valve of extension side is disposed in a confronting relation to the valve seats 25. The disc valve 12 is opened when its outer portion is flexed by the pressure of oil in the extension side passage 24 communicated with the oil chamber 10a, with the result that the oil can flow from the oil chamber 10a to the oil chamber 10b while generating the damping force in accordance with the opening degree of the disc valve.

Within the housing 14 having the bottom, an annular seal member 26 is slidably mounted in liquid-tight engagement with the disc valve 12 and is biased by a spring 27 so that one end of the seal member is always engaged by the disc valve 12. A back pressure chamber 28 of the extension side is defined behind the disc valve by the housing 14 and the seal member 26.

The valve member 15 is provided with a compression side passage 29 for communicating the oil chamber 10b with the oil chamber 10c (i.e. communicating the lower cylinder chamber 1b with the reservoir 5 through the oil passages 22, 23). Annular valve seats 30 are protruded from an end surface (which faces the oil chamber 10c) of the valve member 15 with an opening of the compression side passage 29 disposed between these seats, and a disc valve 16 acting as a damping valve of the compression side is disposed in a confronting relation to the valve seat 30. The disc valve 16 is opened when its outer portion is flexed by the pressure of oil in the compression side passage 29 communicated with the oil chamber 10b, with the result that the oil can flow from the oil chamber 10b to the oil chamber 10c while generating the damping force in accordance with the opening degree of the disc valve.

Within the housing 18, having a bottom, an annular seal member 31 is slidably mounted in liquid-tight engagement with the disc valve 16 and is biased by a spring 32 so that one end of the seal member is always engaged by the disc valve 16. A back pressure chamber 33 of the compression side is defined behind the disc valve 16 by the housing 18 and the seal member 31.

The disc valve 12 is provided with a fixed orifice 34 acting as an upstream passage for communicating the extension side back pressure chamber 28 with the oil chamber 10a, and accordingly the upper cylinder chamber 1a, with flow resistance, and the disc valve 16 is provided with a fixed orifice 35 acting as an upstream passage for communicating the compression side back pressure chamber 33 with the oil chamber 10b, and accordingly the lower cylinder chamber 1b, with flow resistance.

A guide port 36 communicated with the extension side back pressure chamber 28, a guide port 37 communicated with the oil chamber 10b and a guide port 38 communicated with the compression side back pressure chamber 33 are formed in a side wall of the guide member 19.

A cylindrical shutter 39 is rotatably received within the guide member 19. An operation rod 40 is connected to the shutter 39 and has one end extending out of the damper so that the shutter 39 can be rotated from the outside via the operation rod 40. Shutter ports 41, 42, 43, which can be aligned with the guide ports 36, 37, 38, respectively, are formed in a side wall of the shutter 39.

The shutter port 41 is communicated with the shutter port 42 through a shutter chamber 39a formed in the shutter 39, and a downstream passage for the extension side back pressure chamber 28 is constituted by the shutter chamber 39a, shutter port 42 and guide port 37. The shutter port 43 is communicated with the oil chamber 10c through an opening portion of the guide member 19 (downstream passage for the compression side back pressure chamber 33).

A variable orifice of the extension side is constituted by the guide port 36 and the shutter port 41, and a variable orifice of the compression side is constituted by the guide port 38 and the shutter port 43, so that flow areas of these orifices can be changed freely by rotating the shutter 39. Incidentally, the guide port 37 and the shutter port 42 are always communicated with each other with a constant flow area, regardless of the angular position of the shutter 39.

Next, an operation of the hydraulic damper having the above-mentioned construction will be explained.

During the extension stroke of the piston rod 3, the check valve 7 is closed by the shifting movement of the piston 2 to pressurize the hydraulic liquid in the upper own cylinder chamber 1a, with the result that the liquid flows from the upper cylinder chamber into the lower cylinder chamber 1b through the oil passage 21, oil chamber 10a, extension side passage 24, fixed orifice 34, extension side back pressure chamber 28, guide port 36, shutter port 41, shutter chamber 39a, shutter port 42, guide port 37, oil chamber 10b and oil passage 22. When the pressure in the upper cylinder chamber 1a reaches the valve opening pressure for the disc valve 12, the latter is opened to make the liquid directly flow from the extension side passage 24 to the oil chamber 10b. On the other hand, as the piston rod 3 is extended, an amount of the hydraulic fluid corresponding to a volume obtained by the retraction of the piston rod from the cylinder is supplied to the lower cylinder chamber 1b from the reservoir 5 through the check valve 8 due to the expansion of gas.

Before the disc valve is opened, when the piston speed is small, a damping force depending upon the orifice feature is generated in accordance with the flow area of the extension side variable orifice constituted by the guide port 36 and the shutter port 41. When the piston speed is increased so that the pressure in the upper cylinder chamber 1a is also increased to open the disc valve 12, a damping force depending upon the valve feature is generated in accordance with the opening degree of the disc valve. By changing the flow area of the variable orifice by rotating the shutter 39 via the operation rod 40, the damping force feature can be adjusted.

In this case, since the smaller the flow area of the extension side variable orifice is, the greater the pressure loss across the orifice becomes, the pressure in the upstream back pressure chamber 28 of the extension side is increased to minimize the difference in pressure between this back pressure chamber and the oil chamber 10a at the upstream side of the disc valve 12. As a result, since the biasing force directed in the valve closing direction of the disc valve 12 is increased, the valve opening pressure for this disc valve 12 is increased. On the other hand, as the flow area of the extension side variable orifice becomes greater, the pressure in the extension side back pressure chamber 28 becomes smaller, and the difference in pressure between this back pressure chamber and the oil chamber 10a at the upstream side of the disc valve 12 is increased, thereby decreasing the valve opening pressure for this disc valve 12. Accordingly, when the flow area of the extension side variable orifice is changed by rotating the shutter 39 via the operation rod 40, since the orifice feature and the valve feature are changed simultaneously, a great range of change in the damping force can be achieved through the low piston speed to the high piston speed, and, thus, the adjusting range for adjusting the damping force feature can be widened.

During the compression stroke of the piston rod 3, since the check valve 7 is opened by the shifting movement of the piston 2 to make the hydraulic fluid directly flow from the lower cylinder chamber 1b to the upper cylinder chamber 1a the pressure in the upper cylinder chamber 1a becomes the same as the pressure in the lower cylinder chamber 1b, with the result that there is no oil flow between the oil passages 21 and 22 of the damping force generating mechanism 9.

On the other hand, the check valve 8 of the base valve 6 is closed. Thus as the piston rod 3 is retracted, since the hydraulic fluid is pressurized by the retraction of the piston rod into the cylinder 1, the hydraulic fluid flows from the lower cylinder chamber 1b into the reservoir 5 through the oil passage 22, oil chamber 10b, compression side passage 29, fixed orifice 35, compression side back pressure chamber 33, guide port 38, shutter port 43, oil chamber 10c and oil passage 23, thereby compressing the gas. When the pressure in the cylinder 1 reaches the valve opening pressure for the disc valve 16, the latter is opened to make the hydraulic fluid directly flow from the compression side passage 29 to the oil chamber 10c.

Before the disc valve is opened, when the piston speed is small, the damping force depending upon the orifice feature is generated in accordance with the flow area of the compression side variable orifice constituted by the guide port 38 and the shutter port 43. When the piston speed is increased so that the pressure in the cylinder 1 is also increased to open the disc valve 16, the damping force depending upon the valve feature is generated in accordance with the opening degree of the disc valve. By changing the flow area of the variable orifice by rotating the shutter 39 adjusted.

In this case, similar to the extension stroke, since the pressure in the compression side back pressure chamber 33 is changed in accordance with the flow area of the compression side variable orifice, the valve opening pressure for the disc valve 16 is also changed. Thus, when the flow area of the compression side variable orifice is changed by rotating the shutter 39 via the operation rod 40, since the orifice feature and the valve feature are changed simultaneously, a great range of change in the damping force can be achieved through the low piston speed to the high piston speed, and, thus, the adjusting range for adjusting the damping force feature can be widened.

Further, by changing the flow area of the extension side variable orifice constituted by the guide port 36 and the shutter port 41 and the flow area of the compression side variable orifice constituted by the guide port 38 and the shutter port 43, respectively, by rotating the shutter 39, the extension side damping force feature and the compression side damping force feature can be obtained independently.

In this case, for example, by selecting the guide ports and the shutter ports so that the flow area of the extension side variable orifice becomes greater while the flow area of the compression side variable orifice becomes smaller, and vice versa, in accordance with the angular position of the shutter, a combination of the damping force features which differ from each other at the extension side and at the compression side (for example, a combination of extension-hard and compression-soft, or combination of extension-soft and compression-hard) can be set.

During the compression stroke, since the damping force is generated by the flow resistance of the compression side variable orifice (guide port 38 and shutter port 43) and the disc valve 16 provided between the oil passage 22 communicated with the lower cylinder chamber 1b and the oil passage 23 communicated with the reservoir 5, so that the flow resistance is not generated between the upper and lower cylinder chambers 1a, 1b, the negative pressure due to the flow resistance is not generated in the cylinder 1, with the result that a stable damping force can be obtained, and the setting range for the damping force feature can be widened.

Next, a second embodiment of the present invention will be explained with reference to FIG. 2. Since a hydraulic damper of the damping force adjusting type according to the second embodiment is similar to that of the first embodiment, except for the arrangement of fixed orifices and variable orifices communicated with a back pressure chamber of a damping force generating mechanism, the same elements as those of the first embodiment are designated by the same reference numerals, and only the differences will mainly be explained in detail.

Figure 2:
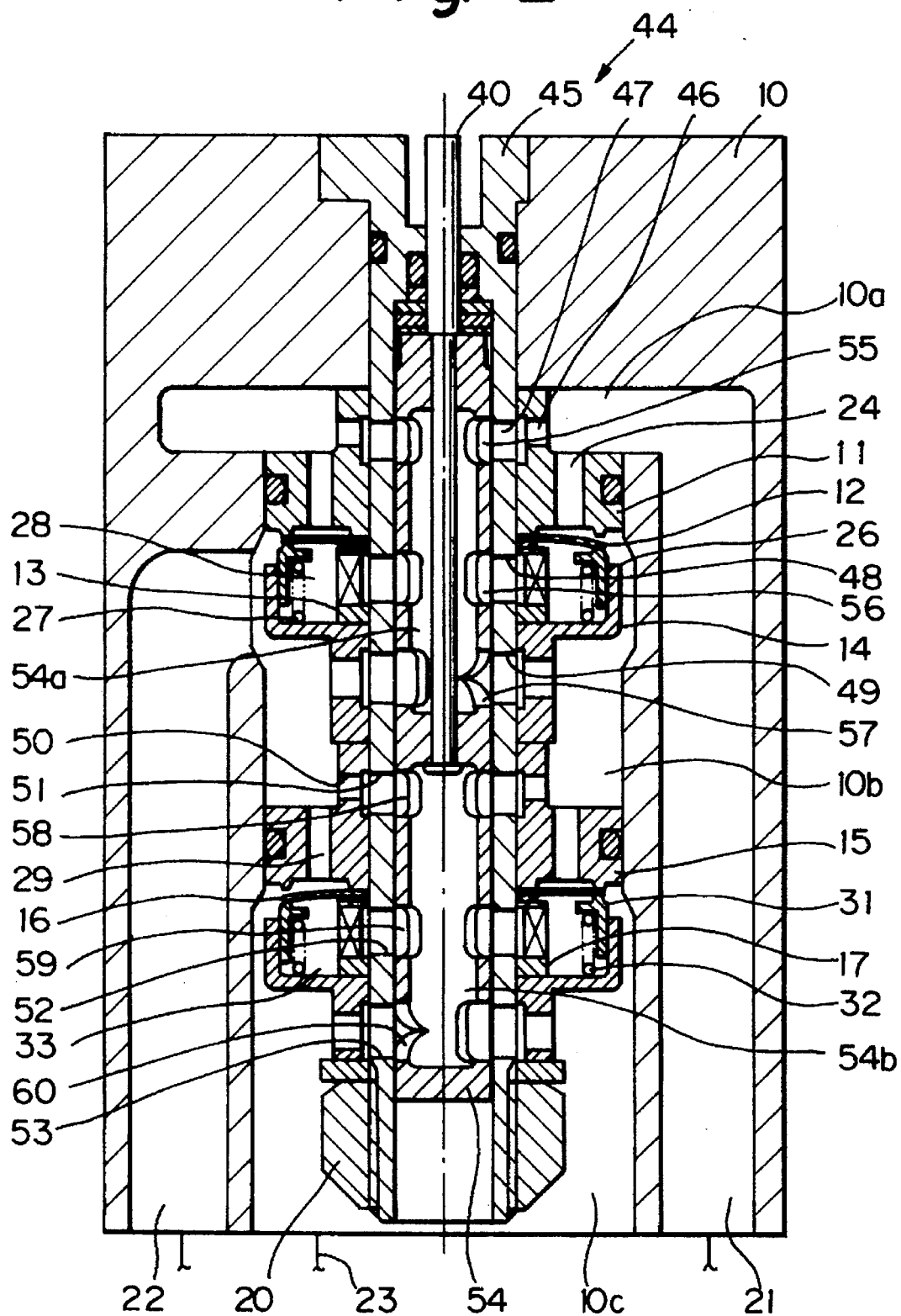
FIG. 2 is a longitudinal sectional view of a damping force generating mechanism as a main portion of a hydraulic damper of a damping force adjusting type according to a second embodiment of the present invention.

As shown in FIG. 2, in a damping force generating mechanism 44 according to the second embodiment, a guide member 45 inserted into the case 10 is provided at its side wall with a guide port 47 communicating with the oil chamber 10a through a fixed orifice 46 formed in the valve member 11. A guide port 48 communicates with the extension side back pressure chamber 28, a guide port 49 communicates with the oil chamber 10b, a guide port 51 communicates with the oil chamber 10b through a fixed orifice 50 formed in the valve member 15, a guide port 52 communicates with the compression side back pressure chamber 33, and a guide port 53 communicates with the oil chamber 10c.

A shutter 54 connected to the operation rod 40 is rotatably received within the guide member 45. The shutter 54 is provided with shutter ports 55, 56, 57, 58, 59, 60, which can be aligned with the guide ports 47, 48, 49, 51, 52, 53, respectively. Two shutter chambers 54a, 54b are formed in the shutter 54 so that the shutter ports 55, 56, 57 are communicated with each other through the shutter chamber 54a and the shutter ports 58, 59, 60 are communicated with each other through the shutter chamber 54b.

The guide port 49 and the shutter port 57 constitute an extension side variable orifice, and the guide port 53 and the shutter port 60 constitute a compression side variable orifice, so that flow areas of the variable orifices can freely be changed by rotating the shutter 54. The guide ports 47, 48, 51, 52 are always communicated with the corresponding shutter ports 55, 56, 58, 59 with constant flow areas regardless of the angular position of the shutter 54.

The fixed orifice of the disc valve 12 and the fixed orifice of the disc valve 16 are omitted.

With this arrangement, during the extension stroke of the piston rod 3, the hydraulic fluid in the oil chamber 10a flows into the shutter chamber 54a through the fixed orifice 46, guide port 47 and shutter port 55 and then is introduced into the extension side back pressure chamber, 28 through the shutter port 56 and guide port 48 and also introduced into the oil chamber 10b through the shutter port 57 and guide port 49 (extension side variable orifice).

Thus, as is in the first embodiment, when the flow area of the extension side variable orifice is changed by rotating the shutter 54, the feature of the extension side orifice can be adjusted and the valve feature can be adjusted by changing the pressure in the extension side back pressure chamber 28.

On the other hand, during the compression stroke of the piston rod, the hydraulic liquid in the oil chamber 10b flows into the shutter chamber 54b through the fixed orifice 50, guide port 51 and shutter port 58 and then is introduced into the compression side back pressure chamber 33 through the shutter port 59 and guide port 52 and also introduced into the oil chamber 10c through the shutter port 60 and guide port 53 (compression side variable orifice).

Thus, as is in the first embodiment, when the flow area of the compression side variable orifice is changed by rotating the shutter 54, the feature of the compression side orifice can be adjusted and the valve feature can be adjusted by changing the pressure in the compression side back pressure chamber 33.

Next, a third embodiment of the present invention will be explained with reference to FIG. 3. Since a hydraulic damper of the damping force adjusting type according to the third embodiment is similar to that of the first embodiment except for the arrangement of a damping force generating mechanism, the same elements as those of the first embodiment are designated by the same reference numerals, and only the differences will mainly be explained in detail.

Figure 3:
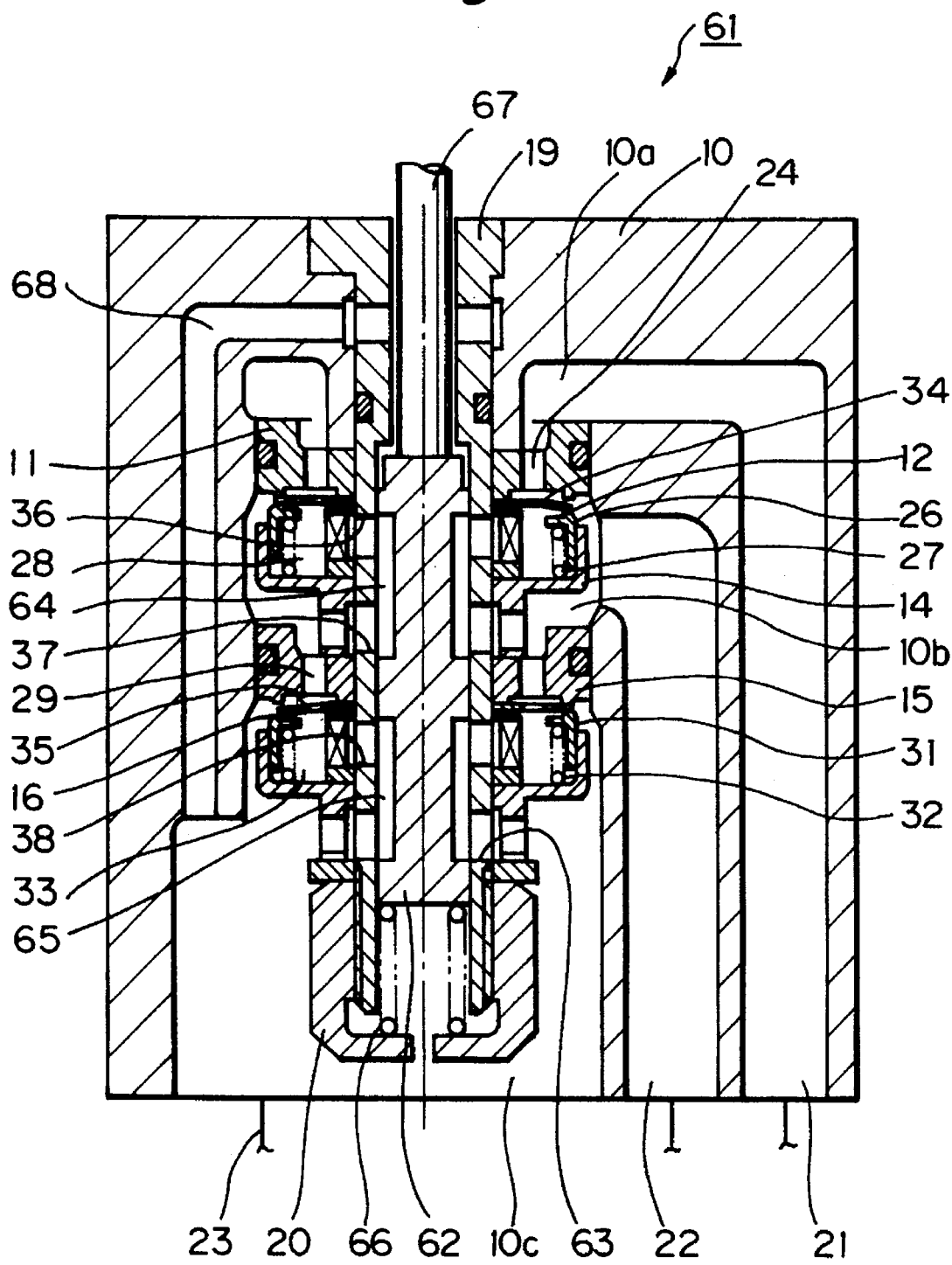
FIG. 3 is a longitudinal sectional view of a damping force generating mechanism as a main portion of a hydraulic damper of a damping force adjusting type according to a third embodiment of the present invention.

As shown in FIG. 3, in a damping force generating mechanism 61 according to the third embodiment, in place of the rotatable shutter, a spool 62 is slidably received within the guide member 19. The guide member 19 is further provided at its side wall with an additional guide port 63 communicating with the oil chamber 10c. The guide ports 36, 37 are communicated with each other through a flow passage 64 formed in the spool 62 to constitute an extension side variable orifice, and the guide ports 38, 63 are communicated with each other through a flow passage 65 formed in the spool 62 to Constitute a compression side variable orifice, so that flow areas of these variable orifices can freely be adjusted by shifting the spool 62.

A compression spring 66 abuts against one end of the spool 62 and an operation rod 67 of an actuator (not shown) abuts against the other end of the spool so that, when the spool 62 is shifted to a desired position by the actuator in opposition to a resilient force of the spring 66, the flow areas of the extension side and compression side variable orifices are changed. In FIG. 3, the reference numeral 68 denotes a passage for introducing the oil in the oil chamber 10c into a space at the other end of the spool 62 to balance the pressures acting on both ends of the spool 62.

With this arrangement, when the flow areas of the extension side and compression side variable orifices are adjusted by shifting the spool 62 by means of the actuator, as is in the first embodiment, the features of the extension side orifice and compression side orifice can be adjusted, and the valve features can be adjusted by changing the pressures in the extension side and compression side back pressure chambers 28, 33.

Next, a fourth embodiment of the present invention will be explained with reference to FIG. 4. Since a hydraulic damper of the damping force adjusting type according to the fourth embodiment is similar to that of the third embodiment except for the arrangement wherein a spool of a damping force generating mechanism is shifted by pilot pressure, the same elements as those of the third embodiment are designated by the same reference numerals, and only the difference will mainly be explained in detail.

Figure 4:
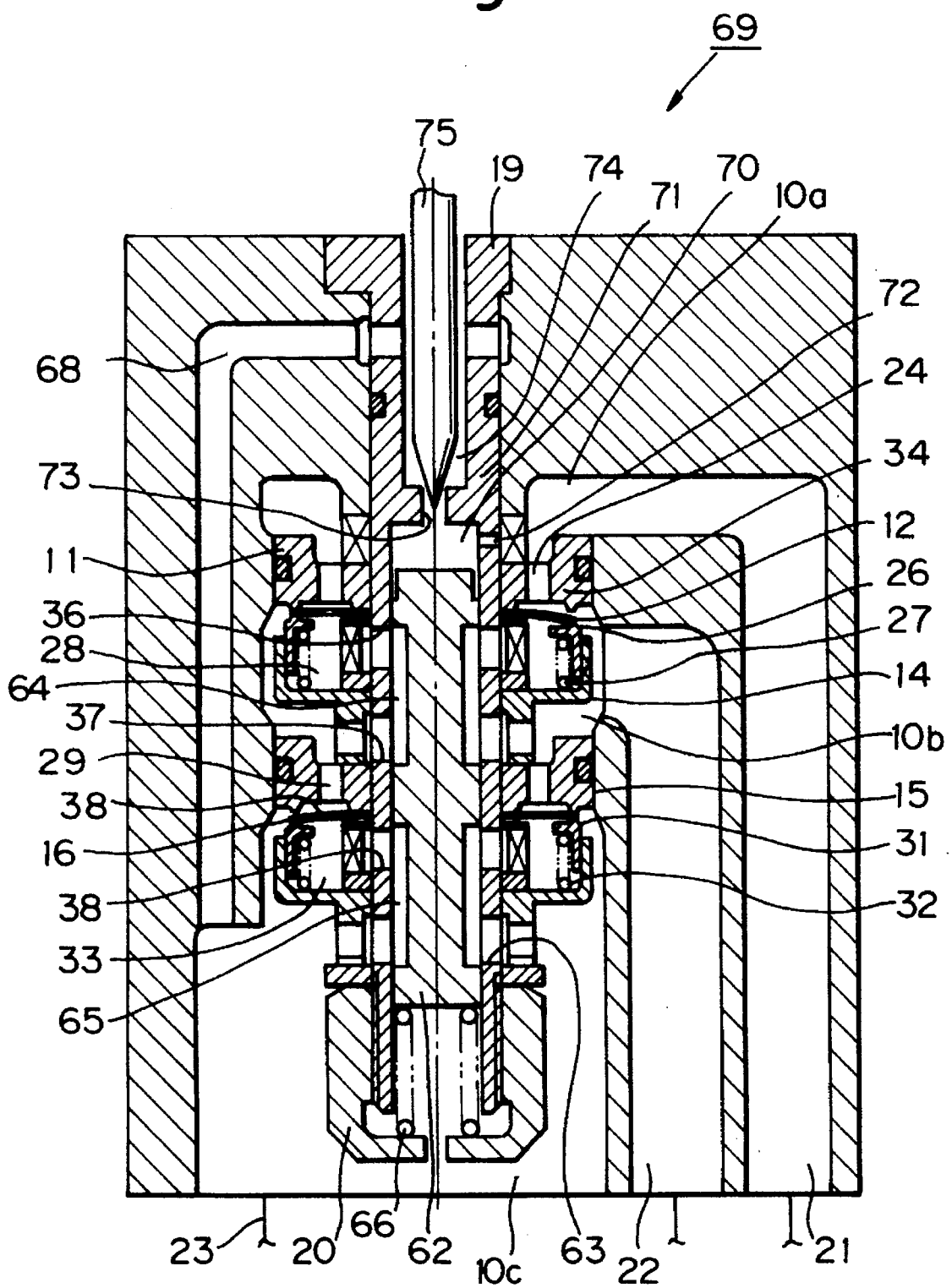
FIG. 4 is a longitudinal sectional view of a damping force generating mechanism as a main portion of a hydraulic damper of a damping force adjusting type according to a fourth embodiment of the present invention.

As shown in FIG. 4, in a damping force generating mechanism 69 according to the fourth embodiment, a pilot chamber 70 and a pressure control valve 71 are provided at one end of the spool 62 in the guide member 19. The pilot chamber 70 is communicated with the oil chamber 10a through a pilot passage (orifice) 72.

The pressure control valve 71 has a needle 75 retractably received in a relief chamber 74 communicated with the pilot chamber 70 through a communication passage 73 so that, when oil pressure in the pilot chamber 70 reaches a predetermined pressure, by opening the communication passage 73 by retraction of the needle 75, the oil in the pilot chamber 70 is discharged into the relief chamber 74. The needle 75 is connected to a plunger of a proportional solenoid (not shown) so that a valve opening pressure for the control valve 71, i.e. a relief pressure of the control valve, can freely be adjusted by controlling the current supplied to the solenoid. The relief chamber 74 is communicated with the oil chamber 10c through a passage (drain) 68.

With this arrangement, during the extension stroke of the piston rod 2, the oil in the upper cylinder chamber 1a pressurized by the shifting movement of the piston 2 is introduced from the oil chamber 10a to the pilot chamber 70 through the pilot passage 72, with the result that the spool 62 is shifted until the pressure of the oil in the pilot chamber 70 (pilot pressure) is balanced with the biasing force of the spring 66, thereby adjusting the flow area of the variable orifice.

In this case, when the pilot pressure reaches the relief pressure of the control valve 71, since the needle 75 is retracted to relieve the oil in the pilot chamber 70 into the relief chamber 74, by adjusting the pilot pressure by controlling the current supplied to the solenoid, the displacement of the spool can be controlled, with the result that, as is in the third embodiment, the feature of the extension side orifice can be adjusted and the valve feature can be adjusted by changing the pressure in the extension side back pressure chamber 28.

On the other hand, during the compression stroke of the piston rod, the liquid in both the upper and lower cylinder chambers 1a, 1b is pressurized by the retraction of the piston rod 3 into the cylinder 1, with the result that the oil in the cylinder 1 is introduced from the oil chamber 10a into the pilot chamber 70 through the pilot passage 72. Accordingly, as is in the above-mentioned extension stroke, by controlling the current supplied to the solenoid, the orifice feature of the compression side can be adjusted, and the valve feature can be adjusted by changing the pressure in the compression side back pressure chamber 33.

Next, a fifth embodiment of the present invention will be explained with reference to FIG. 5. Since a hydraulic damper of the damping force adjusting type according to the fifth embodiment is similar to that of the first embodiment except for the arrangement wherein a sub-valve is provided at a downstream side of a variable orifice communicated with a back pressure chamber of a damping force generating mechanism, the same elements as those of the first embodiment are designated by the same reference numerals, and only the differences will mainly be explained in detail.

Figure 5:
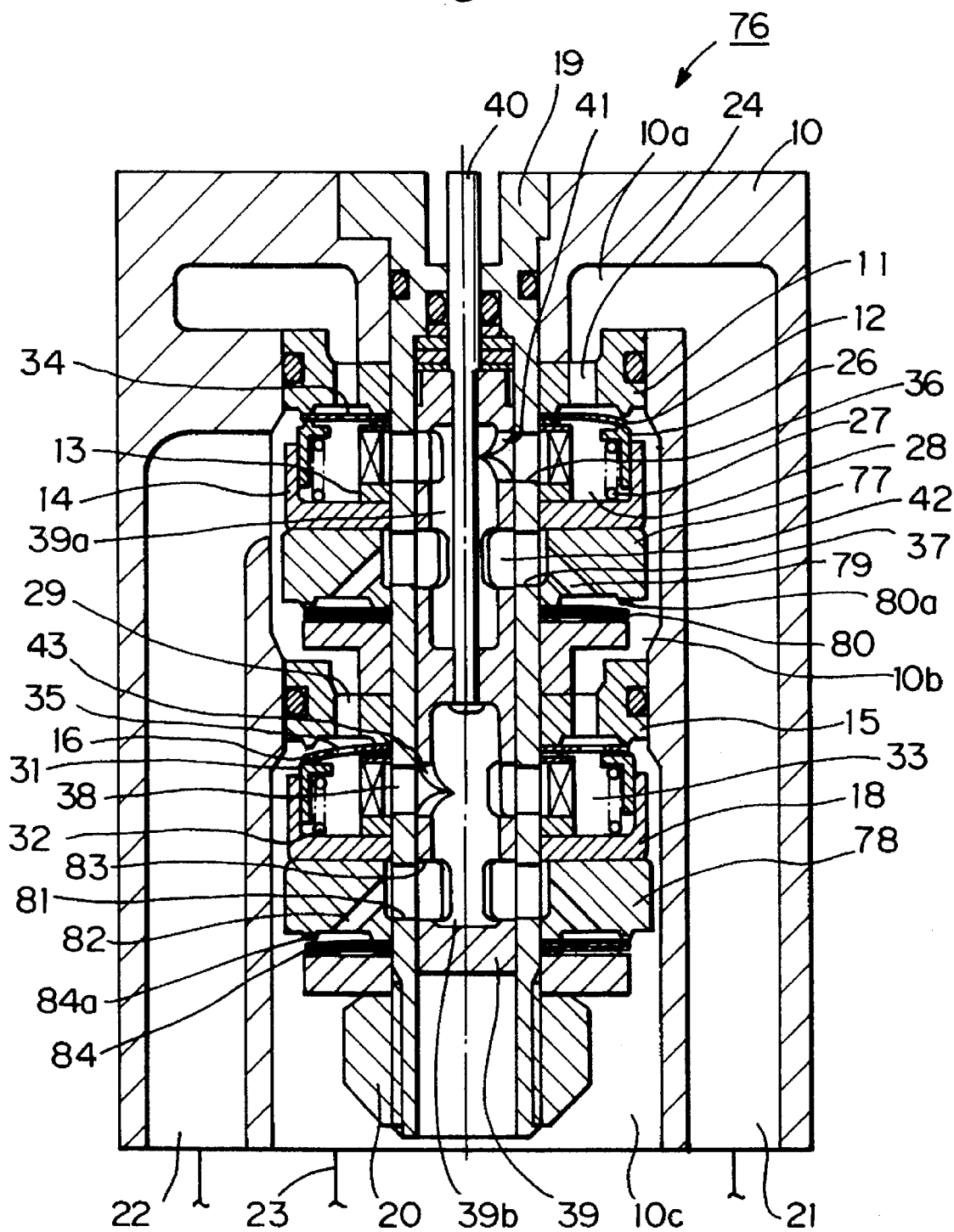
FIG. 5 is a longitudinal sectional view of a damping force generating mechanism as a main portion of a hydraulic damper of a damping force adjusting type according to a fifth embodiment of the present invention.

As shown in FIG. 5, in a damping force generating mechanism 76 according to the fifth embodiment, a sub-valve member 77 is provided between the housing 14 in the case 10 and the valve member 15 and a sub-valve member 78 is disposed under the housing 18 in engagement with the latter.

The sub-valve member 77 is provided with a passage 79 communicating with the guide port 37. Further, there are provided a sub-disc valve 80 for controlling the hydraulic liquid flowing in the passage to generate a damping force, and an orifice 80a in association with a valve seat of the sub-valve member 77. The sub-valve disc 80 is more flexible than the disc valve 12 of the valve member 11, and the orifice 80a has a flow area smaller than that of the fixed orifice 34 of the disc valve 12.

The guide member 19 is provided at its side wall with an additional guide port 81 which is communicated with the oil chamber 10c through a passage 82 formed in the sub-valve member 78. The guide port 81 is always communicated with an additional shutter port 83 formed in the shutter 39 and then is communicated with the shutter port 43 through the shutter chamber 39b of the shutter 39. The sub-valve member 78 is provided with an orifice 84a and a sub-disc valve 84 for controlling the hydraulic liquid flowing in the passage 82 to generate a damping force. The sub-valve disc 84 is more flexible than the disc valve 16 of the valve member 15, and the orifice 84a has a flow area smaller than that of the fixed orifice 35 of the disc valve 16.

With this arrangement, during the extension stroke of the piston rod, the hydraulic fluid—introduced into the shutter chamber 39a through the guide port 36 and shutter port 41 (variable orifice) flows into the oil chamber 10b through the shutter port 42, the guide port 37 and the passage 79 of the sub-valve member 77. As a result, before the sub-disc valve 80 is opened, when the piston speed is very low, the damping force depending upon the orifice feature is generated by the orifice 80a, and when the piston speed is low after the sub-disc valve 80 is opened, the damping force depending upon the valve feature is generated in accordance with the opening degree of the sub-disc valve 80. When the piston speed is further increased to open the disc valve 12, the damping force depending upon the valve feature is generated in accordance with the opening degree of the disc valve 12.

As is in the first embodiment, when the flow area of the variable orifice (guide port 36 and shutter port 41) is changed by rotating the shutter 39, the damping force depending upon the valve feature generated by the sub-disc valve 80 can be directly adjusted, and the damping force depending upon the valve feature generated by the disc valve 12 can be adjusted by changing the pressure in the extension side back pressure chamber 28.

Figure 7:
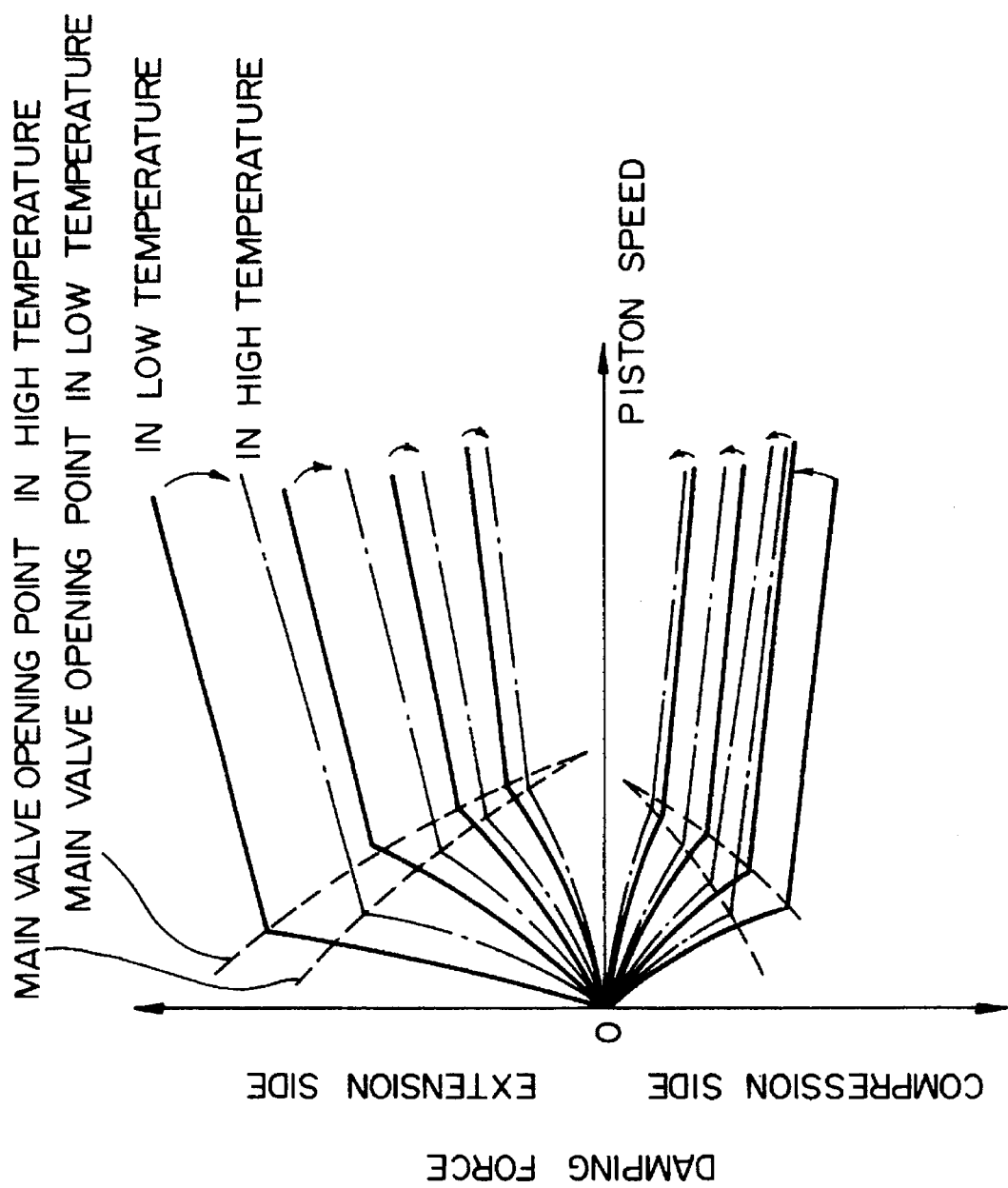
FIG. 7 is a graph showing an influence of changes in temperature upon a damping force feature in the hydraulic damper of a damping force adjusting type.

In this case, since the pressure in the extension side back pressure chamber 28 depends upon the valve force feature (flow resistance) of the sub-disc valve 80, the damping force control is hard to be influenced by the change in viscosity of the hydraulic fluid due to a temperature change, in comparison with the case where the pressure in the back pressure chamber is controlled only by the variable orifice, thereby generating a stable damping force. if the pressure in the back pressure chamber is controlled only by the variable orifice, when the viscosity of the liquid is decreased due to high temperature, since the flow resistance of the variable orifice is greatly decreased, as shown in FIG. 7, the valve opening pressure for the (main) disc valve is decreased, thereby decreasing the damping force greatly.

On the other hand, during the compression stroke of the piston rod, the hydraulic fluid introduced into the shutter chamber 39b through the guide port 38 and shutter port 43 (variable orifice) flows into the oil chamber 10c through the shutter port 83, the guide port 81 and the passage 82 of the sub-valve member 78. As a result, before the sub-disc valve 84 is opened, when the piston speed is very low, the damping force depending upon the orifice feature is generated by the orifice 84a, and when the piston speed is low after the sub-disc valve 84 is opened, the damping force depending upon the valve feature is generated in accordance with the opening degree of the sub-disc valve 84. When the piston speed is further increased to open the disc valve 16, the damping force depending upon the valve feature is generated in accordance with the opening degree of the disc valve 16.

As in the first embodiment, when the flow area of the variable orifice (guide port 38 and shutter port 43) is changed by rotating the shutter 39, the damping force depending upon the valve feature generated by the sub-disc 84 can be directly adjusted, and the damping force depending upon the valve feature generated by the disc valve 16 can be adjusted by changing the pressure in the compression side back pressure chamber 33.

In this case, similar to the extension stroke, since the pressure in the compression side back pressure chamber 33 depends upon the valve force feature of the sub-disc valve 84, the damping force control is hard to be influenced by a change in temperature, thereby generating a stable damping force.

Incidentally, in the illustrated embodiment, while an example where the orifices 80a, 84a are provided in association with the sub-disc valves 80, 84 so that the orifice feature can be set in the very low piston speed area was explained, the orifices 80a, 84a may be omitted.

Next, a sixth embodiment of the present invention will be explained with reference to FIG. 6. Since a hydraulic damper of the damping force adjusting type according to the sixth embodiment is similar to that of the second embodiment except for the arrangement of a back pressure chamber of a damping force generating mechanism, the same elements as those of the second embodiment are designated by the same reference numerals, and only the differences will mainly be explained in detail.

Figure 6:
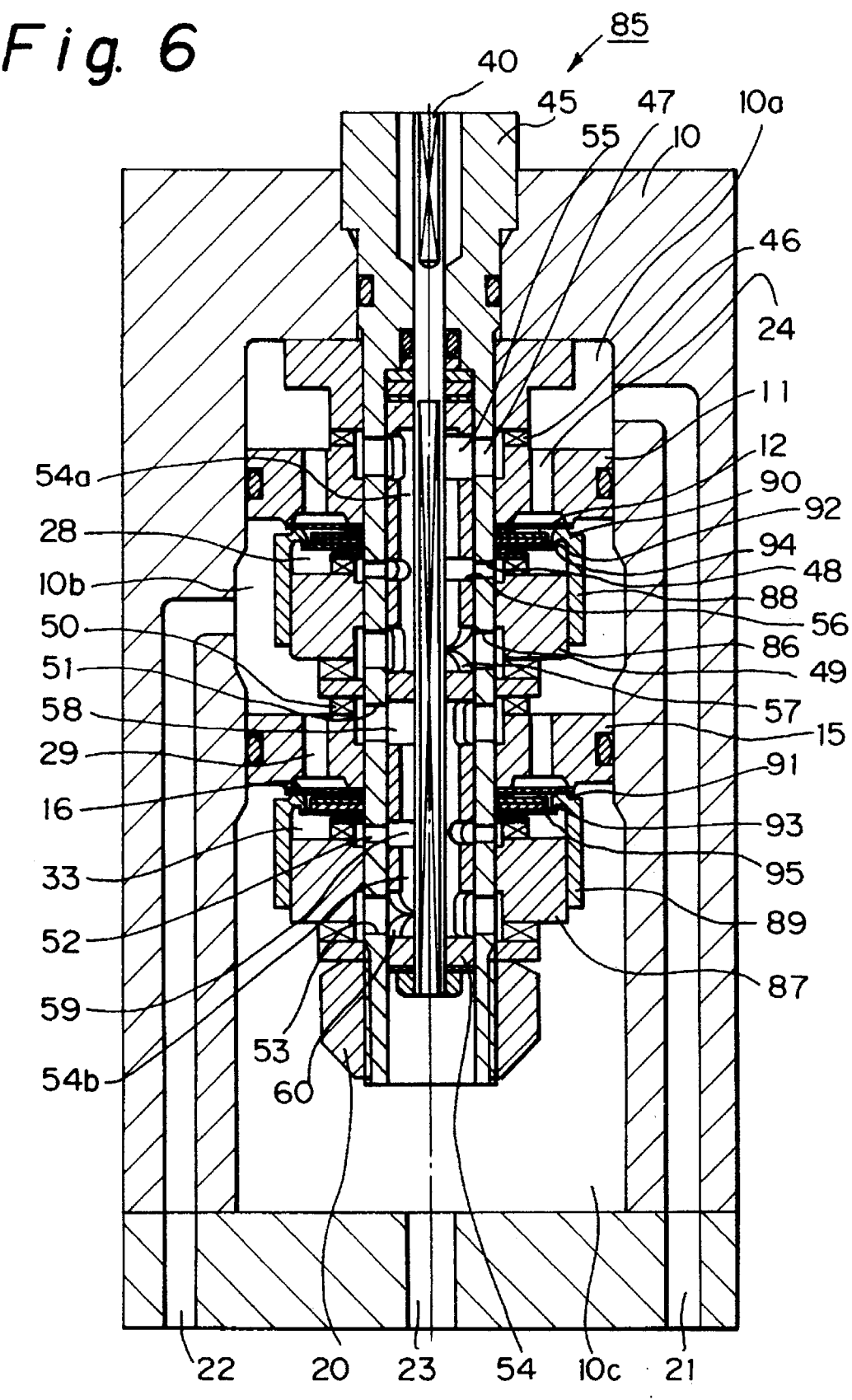
FIG. 6 is a longitudinal sectional view of a damping force generating mechanism as a main portion of a hydraulic damper of a damping force adjusting type according to a sixth embodiment of the present invention.

As shown in FIG. 6, in a damping force generating mechanism 85 according to the sixth embodiment, the guide member 45 mounted within the case 10 is provided with cylindrical fixing members 86, 87 in place of the housings, and annular seal members 88, 89 are slidably, fitted on outer peripheral surfaces of the fixing members 88, 89, respectively. The seal members 86, 87 are provided at their one end with radially inwardly extending flanges on outer (upper) surfaces of which annular abutment portions 90, 91 are formed and on inner (lower) surfaces of which annular seal portions 92, 93 are formed. The disc valves 12, 16 abut against the abutment portions 90, 91, respectively.

Disc-shaped leaf springs 94, 95 are attached to the guide member 45 so that peripheral portions of the springs 94, 95 are engaged by the seal portions 92, 93 of the seal members 88, 89 in a liquid-tight manner to urge the seal members 88, 89 against the disc valves 12, 16, respectively. The fixing member 86, seal member 88 and leaf spring 94 define the extension side back pressure chamber 28, and the fixing member 87, seal member 89 and leaf spring 95 define the compression side back pressure chamber 33.

With this arrangement, the opening degrees of the disc valves 12, 16 are adjusted by urging the abutment portions 90, 91 of the seal members 88, 89 against the back (lower) surfaces of the disc valves 12, 16 under the action of the pressures in the extension side back pressure chamber 28 and the compression side back pressure chamber 33. As in the second embodiment, when the flow areas of the extension side variable orifice (guide port 49 and shutter port 57) and of the compression side variable orifice (guide port 53 and shutter port 60) are changed by rotating the shutter 54, the extension side orifice feature and the compression side orifice feature can be adjusted, and the valve features can be adjusted by changing the pressure in the extension side back pressure chamber 28 and the pressure in the compression side back pressure chamber 33.

In this case, since the leaf springs 94, 95 are urged against the seal portions 92, 93 of the seal members 88, 89 under the action of the pressures in the extension and compression side back pressure chambers 28, 33, the sealing ability is improved. Thus, even when the piston is moved at a low speed (in this condition, the pressures in the extension and compression side back pressure chambers 28, 33 are relatively small), the sealing ability for sealing the extension and compression side back pressure chambers 28, 33 can positively be prevented from being reduced, thereby generating a stable damping force.

Next, a seventh embodiment of the present invention will be explained with reference to FIGS. 8 to 10. Since a hydraulic damper of the damping force adjusting type according to the seventh embodiment has an inner construction of a damping force generating mechanism similar to that of the third embodiment except for the construction of a spool and a seal construction for a back pressure chamber, and has a seal construction for back pressure chambers similar to that of the sixth embodiment, the same elements as those of the third and sixth embodiments will be briefly described, and only the differences will mainly be explained in detail.

Figure 8:
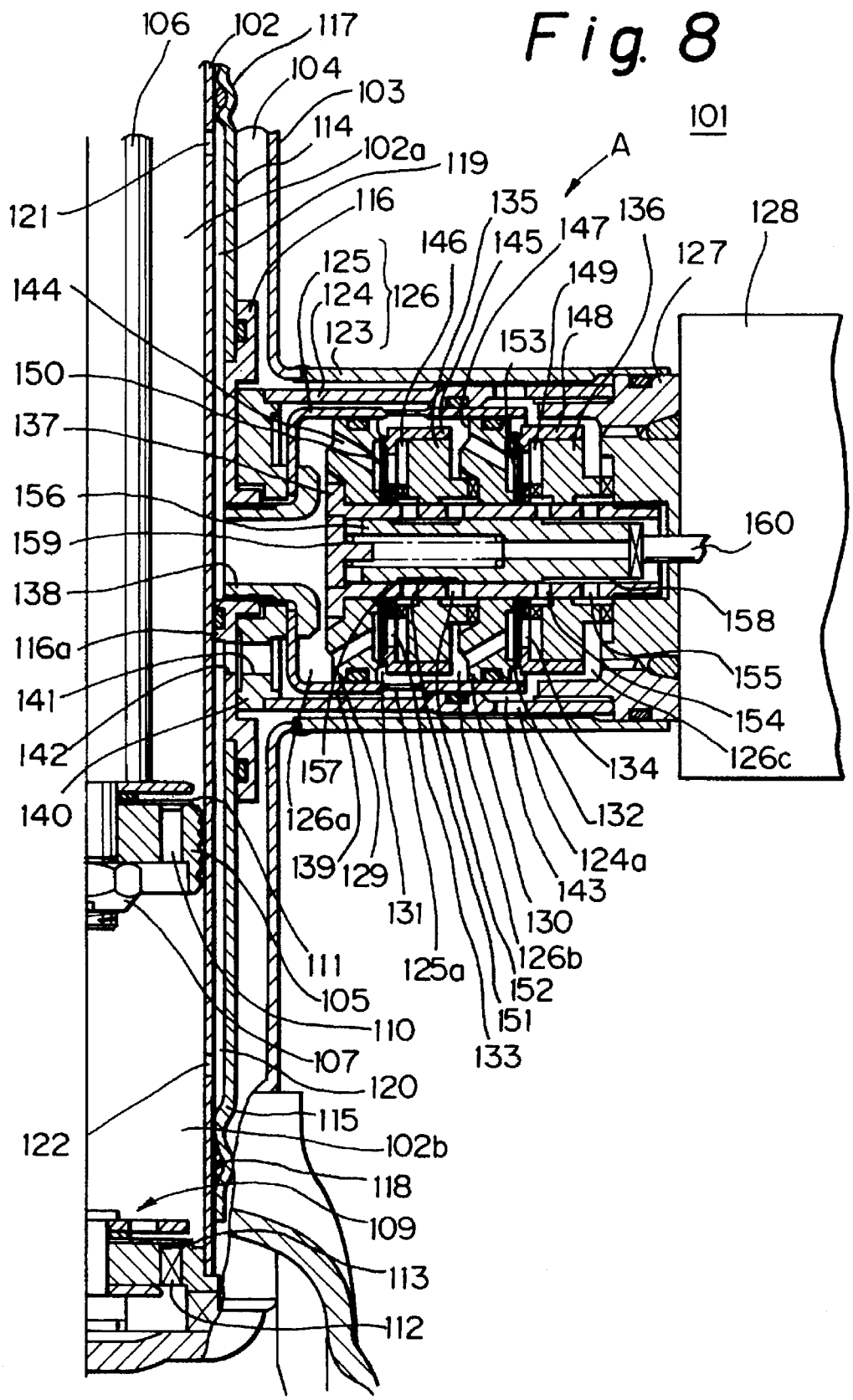
FIG. 8 is a longitudinal sectional view showing a main portion of a hydraulic damper of a damping force adjusting type according to a seventh embodiment of the present invention.
Figure 9:
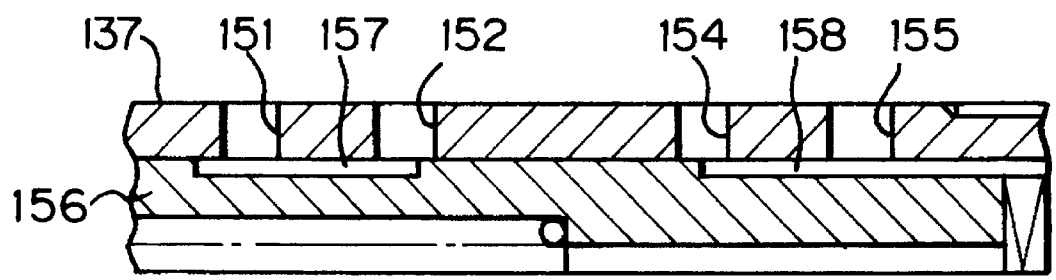
FIG. 9 is an enlarged sectional view showing guide ports and flow passages in a spool of the damping force generating mechanism of the apparatus of FIG. 8.

As shown in FIG. 8, in a hydraulic damper 101 of damping force adjusting type according to the seventh embodiment, an outer cylinder 103 is disposed around an inner cylinder 102 to provide a dual-cylinder construction in which an annular reservoir chamber 104 is defined between the inner and outer cylinders 102, 103. The cylinder 102 contains hydraulic fluid therein, and a reservoir chamber 104 contains hydraulic fluid and gas therein.

A piston 105 is slidably mounted within the cylinder 102, and the interior of the cylinder 102 is divided by the piston 105 into two cylinder chambers, i.e. an upper cylinder chamber 102a and a lower cylinder chamber 102b. One end of a piston rod 106 inserted into the cylinder 102 is connected to the piston 105 by a nut 107, and the other end of the piston rod 106 extends out of the cylinder 102 through a rod guide and an oil seal (both not shown) mounted on the upper ends of the cylinders 102, 103. A base valve 109 for forming bottoms of the lower cylinder chamber 102b and the reservoir chamber 104 is mounted on a lower end of the cylinder 102.

The piston 105 is provided with a liquid passage 110 for communicating the upper and lower cylinder chambers 102a, 102b with each other, and a check valve 111 for permitting only the oil flow from the lower cylinder chamber 102b to the upper cylinder chamber 102a through the liquid passage 110. The base valve 109 is provided with a liquid passage 112 for communicating the lower cylinder chamber 102b with the reservoir chamber 104, and a check valve 113 for permitting only the oil flow from the reservoir chamber 104 to the lower cylinder chamber 102b through the liquid passage 112.

An upper cylindrical passage member 114, a lower cylindrical passage member 115 and a central cylindrical connecting member 116 are fitted onto the cylinder 102. Free ends of the passage members 114, 115 and the cylinder 102 are sealed to each other by O-rings 117, 118, and proximal ends of the passage members are fitted into the connecting member 116 so that annular passages 119, 120 are formed between the passage members and the cylinder 102. The connecting member 116 is provided at its inner central portion with a small diameter portion 116a which is fitted onto the cylinder 102 to isolate the annular passages 119, 120 from each other. The annular passage 119 is communicated with the upper cylinder chamber 102a through a passage 121 formed in the side wall of the cylinder 102 at its upper portion, and the annular passage 120 is communicated with the lower cylinder chamber 102b through a passage 122 formed in the side wall of the cylinder 102 at its lower portion.

A damping force generating mechanism A is attached 3 to the side wall of the outer cylinder 103 in a confronting relation to the connecting member 116. The damping force generating mechanism A has a case 126 comprised of three substantially cylindrical members 123, 124, 125. The case 126 has an opening portion connected to the outer cylinder 103, and a proportional solenoid actuator 128 with a retainer 127 is fitted into the other opening portion of the case 126 to define chambers and passages in the case.

Two valve members 129, 130 are fitted into the member 125 of the case 126 so that the interior of the case 126 is divided by the valve members 129, 130 into three oil chambers 126a, 126b, 126c. A substantially cylindrical guide member 137 extends through the valve members 129, 130, disc valves 131, 132 (described later), disc-shaped leaf springs 133, 134 and annular fixing members 135, 136. By threading a free end of the guide member 137 into the proportional solenoid actuator 128, the elements 129-136 are integrally fixed to each other.

The oil chamber 126a is communicated with the annular passage 119 and accordingly the upper cylinder chamber 102a through an opening of a passage member 138 passing through the connecting member 116. The oil chamber 126b is communicated with the annular passage 120 and accordingly the lower cylinder chamber 102b through a passage 125a formed in the side wall of the member 125, an annular passage 139 formed between the members 124, 125, a passage 141 formed in a retainer 140 and a passage 142 formed in the connecting member 116. The oil chamber 126c is communicated with the reservoir chamber 104 through a passage 124a formed in the side wall of the member 124, and an annular passage 143 formed between the members 123, 124. The valve member 129 is provided with an extension side liquid passage 144 for communicating the oil chamber 126a with the oil chamber 126b. When the disc valve (extension side damping valve) 131 mounted on an end of the valve member 129 at the side of the oil chamber 126b is flexed and opened under the action of the pressure of the hydraulic fluid in the extension side liquid passage 144 communicating with the oil chamber 126a, the damping force is generated in accordance with the opening degree of the disc valve. An annular seal member 145 slidably fitted onto the fixing member 135 is urged against the back surface of the disc valve 131 by the leaf spring 133, and an extension side back pressure chamber 146 is constituted by the disc valve 131, fixing member 135 and seal member 145.

The valve member 130 is provided with a compression side liquid passage 147 for communicating the oil chamber 126b with the oil chamber 126c. When the disc valve (compression side damping valve) 132 mounted on an end of the valve member 130 at the side of the oil chamber 126c is flexed and opened under the action of the pressure of the hydraulic fluid in the compression side liquid passage communicating with the oil chamber 126b, the damping force is generated in accordance with the opening degree of the disc valve. An annular seal member 148 slidably fitted onto the fixing member 136 is urged against the back surface of the disc valve 132 by the leaf spring 134, and a compression side back pressure chamber 149 is constituted by the disc valve 132, fixing member 136 and seal member 148. The extension side back pressure chamber 146 is communicated with the oil chamber 126a through a fixed orifice (extension side upstream passage) 150 and is also communicated with the oil chamber 126b through guide ports (extension side downstream passage) 151, 152 formed in the side wall of the guide member 137. The compression side back pressure chamber 149 is communicated with the oil chamber 126b through a fixed orifice (compression side upstream passage) 153 and is also communicated with the oil chamber 126c through guide ports (compression side downstream passage) 154, 155 formed in the side wall of the guide member 137. The leaf springs 133, 134 are provided with a plurality of passages for communicating the fixed orifice 150 with the guide port 151 and the fixed orifice 153 and the guide port 154, respectively.

A spool 156 is slidably received in the guide member 137. The spool 156 has a liquid passage 157 for communicating the extension side guide ports 151, 152 with each other, and a livid passage 158 for communicating the compression side guide posts 154, 155 with each other. As shown in FIG. 9, the livid passage 157 is always communicated with the upstream guide port 151 with a constant flow area regardless of the shifting movement of the spool 156, but the flow area of the downstream guide port (extension side variable orifice) 152 is adjusted by the shifting movement of the spool 156. The liquid passage 158 can adjust the flow area between this passage and the upstream guide port (compression side variable orifice) 154 and is always communicated with the downstream guide port 155 with a constant flow area. Accordingly, the flow area of the guide port (extension side-variable orifice) 151 becomes greater while the flow area of the guide port (compression side variable orifice) 155 becomes smaller and vice versa, in accordance with the position of the spool 156.

Figure 10:
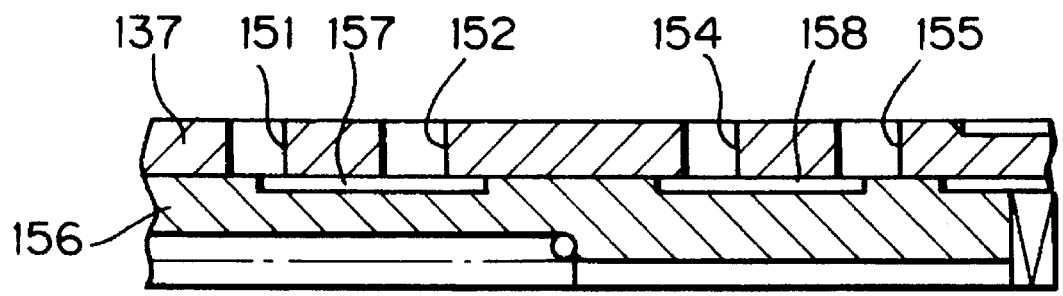
FIG. 10 is an enlarged sectional view showing an alteration of FIG. 9.

In place of the above arrangement, as shown in FIG. 10, the livid passages 157, 158 may be disposed so that the livid passage 147 can adjust the flow area of the upstream guide port (extension side variable orifice) 151 and is always communicated with the downstream guide port 152 with the constant flow area and that the liquid passage 158 is always communicated with the upward guide port 154 with the constant flow area and can adjust the flow area of the downstream guide port (compression side variable orifice) 155. Also in this case, the flow areas of the extension side and compression side variable orifices can be adjusted.

The spool 156 is always biased toward one direction by a spring 159 and can be shifted in opposition to a biasing force of the spring 159 by an operation rod 160 of the proportional solenoid actuator 128 to position the spool in accordance with the thrust force of the operation rod. In this way, the flow areas of the guide ports 152, 154 (in the arrangement as shown in FIG. 10, guide ports 151, 155) can be adjusted.

Next, an operation of the hydraulic damper having the above-mentioned construction will be explained.

During the extension stroke of the piston rod 106, the check valve 111 is closed by the shifting movement of the piston 105 to pressurize the hydraulic liquid in the upper cylinder chamber 102a, with the result that the liquid flows from the upper cylinder chamber into the interior of the passage member 138 of the damping force generating mechanism A through the passage 121 and the annular passage 119, and then flows into the annular passage 120 through the oil chamber 126a, extension side passage 144, fixed orifice 150 of the disc valve 131, extension side back pressure chamber 146, guide ports 151, 152, oil chamber 126b, passages 125a, 139, 141 and 142, and then flows into the lower cylinder chamber 102b through the passage 122. When the pressure in the upper cylinder chamber 102a reaches the valve opening pressure to open the disc valve 131, the hydraulic liquid flows from the extension side passage 144 to the oil chamber 126b directly. In this case, as the piston rod 106 is extended, an amount of hydraulic fluid corresponding to the retraction of the piston rod 106 from the cylinder 102 is replenished from the reservoir chamber 104 into the lower cylinder chamber 102b through the liquid passage 112 since the check valve 113 of the base valve 109 can be opened by the expansion of gas.

Thus, when the piston speed is small before the disc valve 131 is opened, a damping force depending upon the orifice feature is generated in accordance with the flow area of the guide port 152 (or 151). When the piston speed is increased so that the pressure in the upper cylinder chamber 102a is also increased to open the disc valve 131, a damping force depending upon the valve feature is generated, in accordance with the opening degree of the disc valve. By changing the flow area of the guide port 152 (or 151) by shifting the spool 156, the damping force feature can be adjusted.

In this case, since the smaller the flow area of guide port 152 (or 151) is, as the pressure loss across the guide port becomes greater, and accordingly the pressure (acting toward the valve closing direction for the disc valve 131) in the extension side back pressure chamber 146 becomes greater, the valve opening pressure for the disc valve 131 is also increased. Accordingly, by changing the flow area of the guide port 152 (or 151) by shifting the spool 156, since the orifice feature and the valve feature are changed simultaneously, a great range of change in the damping force can be achieved through the low piston speed to the high piston speed, and thus, the adjusting range for adjusting the damping force feature can be widened.

During the compression stroke of the piston rod, since the check valve 111 is opened by the shifting movement of the piston 105 to make the hydraulic fluid directly flow from the lower cylinder chamber 102b to the upper cylinder chamber 102a through the liquid passage 110, the pressure in the upper cylinder chamber 102a becomes substantially the same as the pressure in the lower cylinder chamber 102b, with the result that there is no oil flow between the oil chambers 126a, 126b of the damping force generating mechanism A.

On the other hand, the check valve 113 of the base valve 109 is closed. As the piston rod 106 is retracted, since the hydraulic liquid is pressurized by the insertion of the piston rod 106 into the cylinder 102, the hydraulic fluid flows from the lower cylinder chamber 102b into the passage 141 of the damping force generating mechanism A through the passage 122, annular passage 120 and passage 142, and then flows into the reservoir chamber 104 through the passage 139, passage 125a, oil chamber 126b, compression side passage 147, fixed orifice 153 of the disc valve 132, compression side back pressure chamber 149, guide ports 154, 155, oil chamber 126c, and passages 124a and 143. When the pressures in the upper and lower cylinder chambers 102a, 102b reach the valve opening pressure for the disc valve 132, the latter is opened to make the hydraulic fluid directly flow from the compression side passage 147 to the oil chamber 126c.

As is in the extension stroke, before the disc valve is opened, when the piston speed is small, the damping force depending upon the orifice feature is generated in accordance with the flow area of the guide port 154 (or 155) acting as the variable orifice. When the piston speed is increased so that the pressures in the upper and lower cylinder chambers 102a, 102b are also increased to open the disc valve 132, the damping force depending upon the valve feature is generated in accordance with the opening degree of the disc valve. By changing the flow area of the guide port 154 (or 155) by shifting the spool 156 via the actuator 128, the damping force feature can be adjusted.

In this case, since the smaller the flow area of the guide port 154 (or 155) is, the greater the pressure loss across the guide port becomes, to thereby increase the pressure in the compression side back pressure chamber 149. This pressure acts in the valve closing direction for the disc valve 132. Thus, the valve opening pressure for the disc valve 132 is also changed. Thus, when the flow area of the guide port 154 (or 155) is changed by shifting the spool 156, since the orifice feature and the valve feature are changed simultaneously, a great range of change in the damping force can be achieved through the low piston speed to the high piston speed, and thus, the adjusting range for adjusting the damping force feature can be widened.

Further, by changing the flow areas of the guide ports 152, 154 (or 151, 155) acting as the variable orifices by shifting the spool 156, the extension side damping force feature and the compression side damping force feature can be obtained independently. In the illustrated embodiment, since the flow area of the guide port 152 (or 151), acting as the extension side variable orifice, becomes greater, while the flow area of the guide port 154 (or 155), acting as the compression side variable orifice, becomes smaller, and vice versa, in accordance with the shifted position of the spool 156, a combination of damping force features which differ from each other at the extension side and at the compression side (for example, combination of extension hard and compression-soft, or combination of extension-soft and compression-hard) can be set.

As is in the above-mentioned embodiment, during the compression stroke of the piston rod 106, since the flow resistance is not generated between the upper and lower cylinder chambers 102a, 102b, negative pressure is not generated in the upper cylinder chamber 102a, with the result that a stable damping force can be obtained and the setting range for the damping force feature can be widened.

Next, an eighth embodiment of the present invention will be explained with reference to FIGS. 11 to 15. Since a hydraulic damper of the damping force adjusting type according to the eighth embodiment is similar to that of the first embodiment, and a damping force adjusting mechanism is substantially similar to that of the seventh embodiment except for the construction of a spool, the same elements regarding the hydraulic damper as those of the first embodiment are designated by the same reference numerals, and the elements similar to those in the first and seventh embodiments are briefly explained, and only the differences will mainly be explained in detail.

Figure 11:
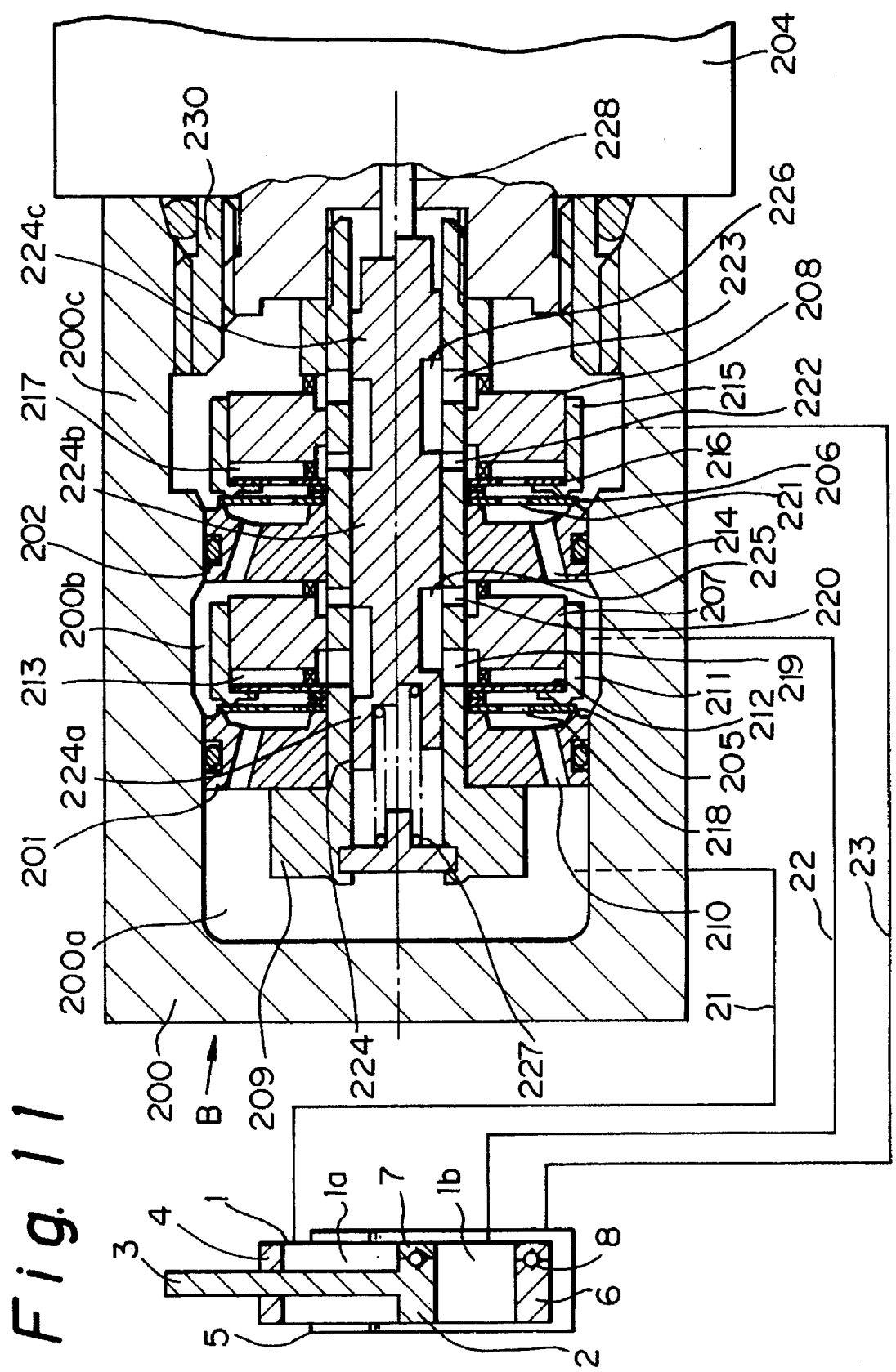
FIG. 11 is a longitudinal sectional view of a hydraulic damper of a damping force adjusting type according to an eighth embodiment of the present invention.

As shown in FIG. 11, according to a damping force generating mechanism according to the eighth embodiment, in a damping force generating mechanism B, two valve members 201, 202 are fitted within a case 200 having a base, and a proportional solenoid actuator 204 (referred to as actuator 204 hereinafter) with a retainer 203 is fitted into an opening portion of the case 200, so that the interior of the case 200 is divided into three oil chambers 200a, 200b, 200c by the valve members 201, 202. A substantially cylindrical guide member 209 extends through the valve members 201, 202, disc valves 205, 206 (described later) and fixing members 207, 208. By threading a free end of the guide member 209 into the actuator 204, the elements 201, 202, 205, 208 are integrally fixed to each other. The three oil chambers 200a, 200b, 200c are communicated with the upper cylinder chamber 1a, lower cylinder chamber 1b and reservoir chamber 5 through oil passages 21, 22, 23, respectively.

The valve member 201 is provided with an extension side passage 210 for communicating the oil chamber 200a with the oil chamber 200b and a disc valve 205. When the disc valve 205 is flexed and opened under the action of the pressure of the hydraulic liquid in the extension side passage 210 communicating with the oil chamber 200a, the hydraulic fluid can flow toward the oil chamber 200b, thereby generating the damping force in accordance with the opening degree of the disc valve. An annular seal member 211 slidably fitted onto the fixing member 207 is urged i against the back surface of the disc valve 205 by a leaf spring 212 having a communication passage, and an extension side back pressure chamber 213 is constituted by the disc valve 205, fixing member 207 and seal member 211. The valve member 202 is provided with a compression side passage 214 for communicating the oil chamber 200b with the oil chamber 200c and a disc valve 206. When the disc valve 206 is flexed and opened under the action of the pressure of the hydraulic liquid in the compression side passage 214 communicating with the oil chamber 200b, the hydraulic fluid can flow toward the oil chamber 200c, thereby generating the damping force in accordance with the opening degree of the disc valve. An annular seal member 215 slidably fitted onto the fixing member 208 is urged against the back surface of the disc valve 296 by the leaf spring 216 having a communication passage, and a compression side back pressure chamber 217 is constituted by the disc valve 205, fixing member 208 and seal member 215.

The extension side back pressure chamber 213 is communicated with the oil chamber 200a through a fixed orifice (extension side upstream passage) 218 formed in the disc valve 205 and is also communicated with the oil chamber 200b through a guide port 219 and a guide port (variable orifice) 220 formed in the guide member 209. The compression side back pressure chamber 217 is communicated with the oil chamber 200b through a fixed orifice (compression side upstream passage) 221 formed in the disc valve 206 and is also communicated with the oil chamber 200c through a guide port (variable orifice) 222 and a guide port 223 formed in the guide member 209.

A spool 224 is slidably received in the guide member 209. As is in the seventh embodiment, the spool 224 has a liquid passage 225 for communicating the extension side guide ports 219, 220 with each other, and a liquid passage 226 for communicating the compression side guide ports 222, 223 with each other. Within a normal operating range of the spool 224, when the spool 224 is shifted, the liquid passage 225 is always communicated with the upstream guide port 219 with a flow area greater than a flow area of the downstream guide port 220, thereby adjusting the flow area of the downstream guide port (extension side variable orifice) 220. The liquid passage 226 can adjust the flow area between this passage and the upstream guide port (compression side variable orifice) 222 and is always communicated with the downstream guide port 223 with a flow area greater than a flow area of the upstream side guide port 222.

Accordingly, the flow area of the guide port (extension side variable orifice) 220 becomes greater while the flow area of the guide port (compression side variable orifice) 222 becomes smaller and vice versa, in accordance with the position of the spool 224. In FIG. 11, an upper half of the damping force generating mechanism B shows a position of the spool 224 where the flow area of the extension side guide port 220 becomes smaller than the flow area of the compression side guide port 222, and a lower half of the mechanism B shows a position of the spool 224 where the flow area of the extension side guide port 220 becomes greater than the flow area of the compression side guide port 222.

The spool 224 is always biased in one direction by a spring 227. By shifting and positioning the spool 224 in opposition to a biasing force of the spring 227 under the action of a thrust force generated by an operation rod 228 of the actuator 204, the flow areas of the guide ports 220, 222 can be adjusted.

Figure 12:
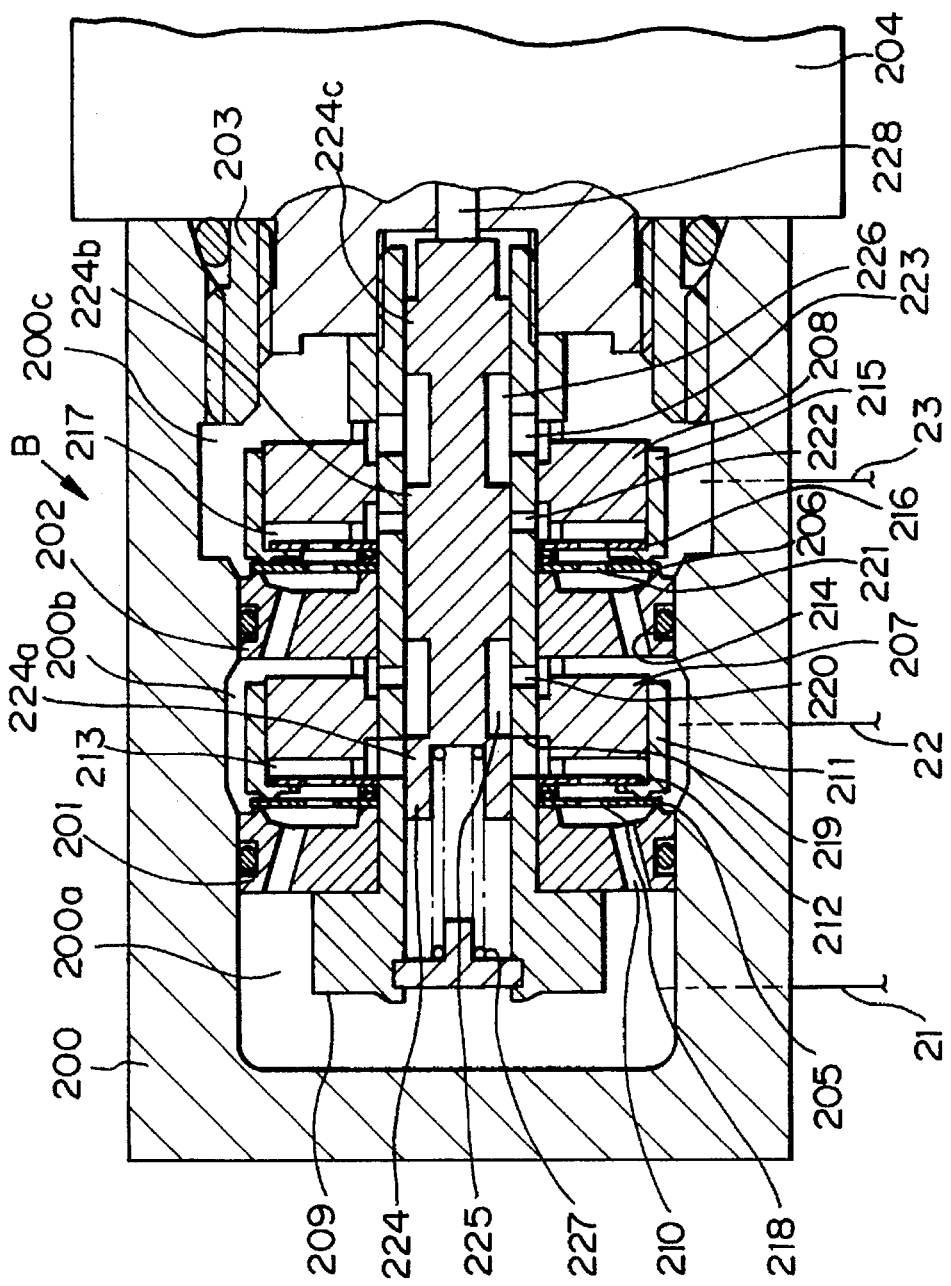
FIG. 12 is similar to FIG. 11, but showing a position of the spool when no current is applied to an actuator of the damping force generating mechanism.

When no current is applied to the actuator 204, i.e. when there is no thrust force of the operation rod 228, the spool 224 is shifted to the rightmost position (near the actuator 204) of FIG. 12 by the biasing force of the spring 227, with the result that the extension side guide port 219 and the compression side guide port 222 are closed (or restricted) by land portions 224a, 224b of the spool 224, respectively.

Next, an operation of the damper according to the eighth embodiment having the above construction will be explained.

During the extension stroke of the piston rod 3, the check valve 7 is closed by the shifting movement of the piston 2 to pressurize the hydraulic fluid in the upper cylinder chamber 1a, with the result that the liquid flows from the upper cylinder chamber into the oil chamber 200a of the damping force generating mechanism B through the oil passage 21 and then flows into the lower cylinder chamber 1b through the extension side passage 210, fixed orifice 218, extension side back pressure chamber 213, guide ports 219, 220, oil chamber 200b and oil passage 22. When the pressure in the upper cylinder chamber 1a reaches the valve opening pressure for the disc valve 205, the latter is opened to make the fluid directly flow from the extension side passage 210 to the oil chamber 200b. In this case, as the piston rod 3 is extended, an amount of the hydraulic fluid corresponding to a volume obtained by the retraction of the piston rod 3 from the cylinder 1 is supplied to the lower cylinder chamber 1b from the reservoir 5 through the opened check valve 8 due to expansion of gas.

As is in the seventh embodiment, before the disc valve 205 is opened, when the piston speed is small, a damping force depending upon the orifice feature is generated in accordance with the flow area of the guide port (variable orifice) 220. When the piston speed is increased to open the disc valve 205, a damping force depending upon the valve feature is generated in accordance with the opening degree of the disc valve. By changing the flow area of the guide port 220 by shifting the spool 224 under the action of the actuator 204, the damping force feature can be adjusted.

In this case, since the smaller the flow area of the guide port 220 is, the greater the pressure loss across the guide port becomes, and the pressure in the extension side back pressure chamber 213 is increased. Since this pressure acts toward the valve closing direction for the disc valve 205, the valve opening pressure for the disc valve 205 is also increased. Accordingly, when the flow area of the guide port 220 is changed by shifting the spool 224, since the orifice feature and the valve feature are changed simultaneously, a great range of change in the damping force can be achieved through the low piston speed to the high piston speed, and thus, the adjusting range for adjusting the damping force feature can be widened.

During the compression stroke of the piston rod, since the check valve 7 is opened by the shifting movement of the piston 2 to make the hydraulic fluid flow directly from the lower cylinder chamber 1b to the upper cylinder chamber 1a, the pressure in the upper cylinder chamber 1a becomes the same as the pressure in the lower cylinder chamber 1b, with the result that there is no oil flow between the oil passages 21 and 22.

On the other hand, the check valve 8 of the base valve 6 is closed. As the piston rod 3 is retracted, since the hydraulic fluid is pressurized by the insertion of the piston rod 3 into the cylinder 1, the hydraulic fluid flows from the lower cylinder chamber 1b into the oil chamber 200b through the oil passage 22 and then flows into the reservoir 5 through the compression side passage 214, fixed orifice 221, compression side back pressure chamber 217, guide ports 222, 223, oil chamber 200c and oil passage 23. When the pressure in the cylinder 1 reaches the valve opening pressure for the disc valve 206, the latter is opened to make the hydraulic fluid directly flow from the compression side passage 214 to the oil chamber 200c.

As in the extension stroke, before the disc valve 206 is opened, when the piston speed is small, the damping force depending upon the orifice feature is generated in accordance with the flow area of the guide port (variable orifice) 222. When the piston speed is increased so that the pressure in the cylinder 1 is also increased to open the disc valve 206, the damping force depending upon the valve feature is generated in accordance with the opening degree of the disc valve. By changing the flow area of the guide port 222 by shifting the spool 224 under the action of the actuator 204, the damping force feature can be adjusted.

In this case, since the smaller the flow area of the guide port 222 is, the greater the pressure loss across the guide port becomes, and the pressure in the compression side back pressure chamber 217 is increased. Since this pressure acts in the valve closing direction for the disc valve 206, the valve opening pressure for the disc valve 206 is also increased. Accordingly, when the flow area of the guide port 222 is changed by shifting the spool 224, since the orifice feature and the valve feature are changed simultaneously, a great range of change in the damping force can be achieved through the low piston speed to the high piston speed, and thus the adjusting range for adjusting the damping force feature can be widened.

Further, by changing the flow areas of the guide ports (variable orifices) 220, 222 by shifting the spool 224, the extension side damping force feature and the compression side damping force feature can be obtained independently. In the illustrated embodiment, since the flow area of the guide port (extension side variable orifice) 220 becomes greater while the flow area of the guide port (compression side variable orifice) 222 becomes smaller, and vice versa, in accordance with the position of the spool, a combination of damping force features which differ from each other at the extension side and at the compression side (for example, combination of extension-hard and compression-soft, or combination of extension-soft and compression-hard) can be set.

As in the above-mentioned embodiments, during the compression stroke, since flow resistance is not generated between the upper and lower cylinder chambers 1a, 1b, negative pressure is not generated in the upper cylinder chamber 1a, with the result that a stable damping force can be obtained and the setting range for the damping force feature can be widened.

If the current is not supplied to the actuator 204 for any reason such as breakage of an electric wire, the spool 224 is shifted to the position shown in FIG. 12 by the biasing force of the spring 227. As a result, since the extension side guide port 219 and the compression side guide port 222 are closed (or restricted), the damping force feature becomes "extension-hard" and "compression-hard", thereby maintaining the steering stability of the vehicle in a suitable condition and achieving a fail-safe.

Figure 13:
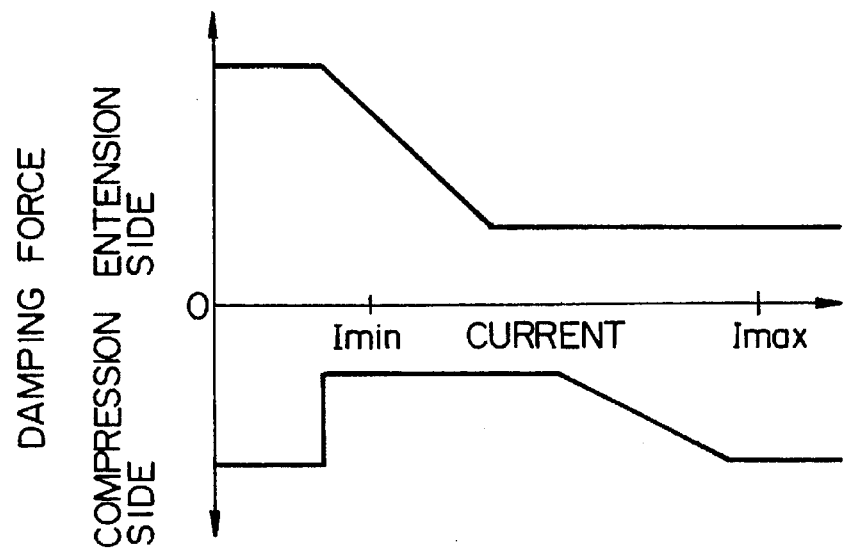
FIG. 13 is a graph showing a damping force feature of the apparatus of FIG. 11.

FIG. 13 shows a relation between the current supplied to the actuator 204 and the damping forces of extension and compression sides. As shown in FIG. 13, in the abovementioned embodiment, when no current is supplied to the actuator, the damping force feature becomes both the "extension-hard" and the "compression-hard". Within a predetermined current range from $I_{min}$ to $I_{max}$ which corresponds to a normal operating range of the spool 224, as the current (thrust force of the actuator 204) is increased, the extension side is changed from "hard" to "soft" and the compression side is changed from "soft" to "hard".

In the illustrated embodiment, while an example was explained where the spool 224 is urged in opposition to the biasing force of the spring 227 under the action of the thrust force of the operation rod 228 of the actuator 204 of push type, generated in accordance with the supplied current to adjust the damping force, the spring 227 may be arranged at the other side of the spool 224 so that the spool 224 connected to the operation rod of the actuator of pull type is pulled in accordance with the supplied current in opposition to the biasing force of the spring to adjust the damping force. In this case, when the spool 224 is shifted away from the actuator (i.e. to the left in FIG. 11) by the biasing force of the spring 227, the extension side guide port 220 the compression side guide port 223 are closed by the land portions 224b, 224c of the spool 224, thereby achieving the same fail safe as that of the eighth embodiment.

Figure 14:
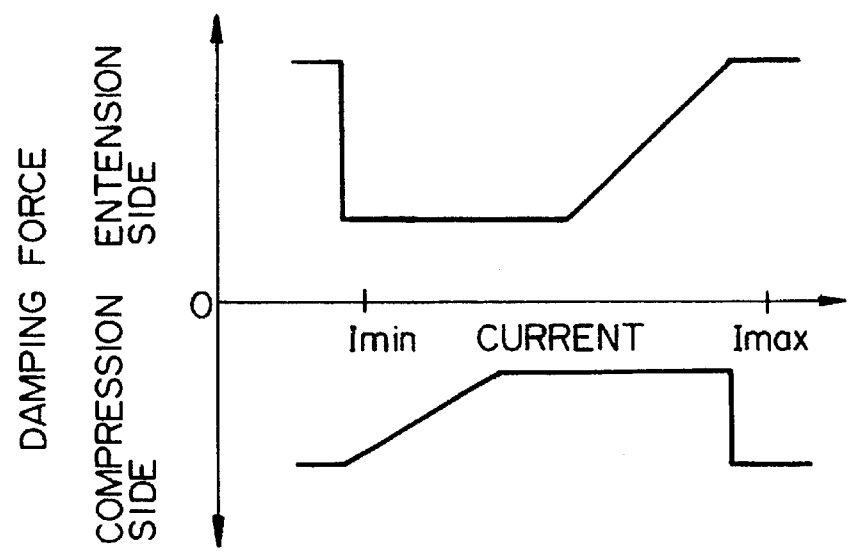
FIG. 14 is a graph showing a damping force feature of an alteration of the eighth embodiment.
Figure 15:
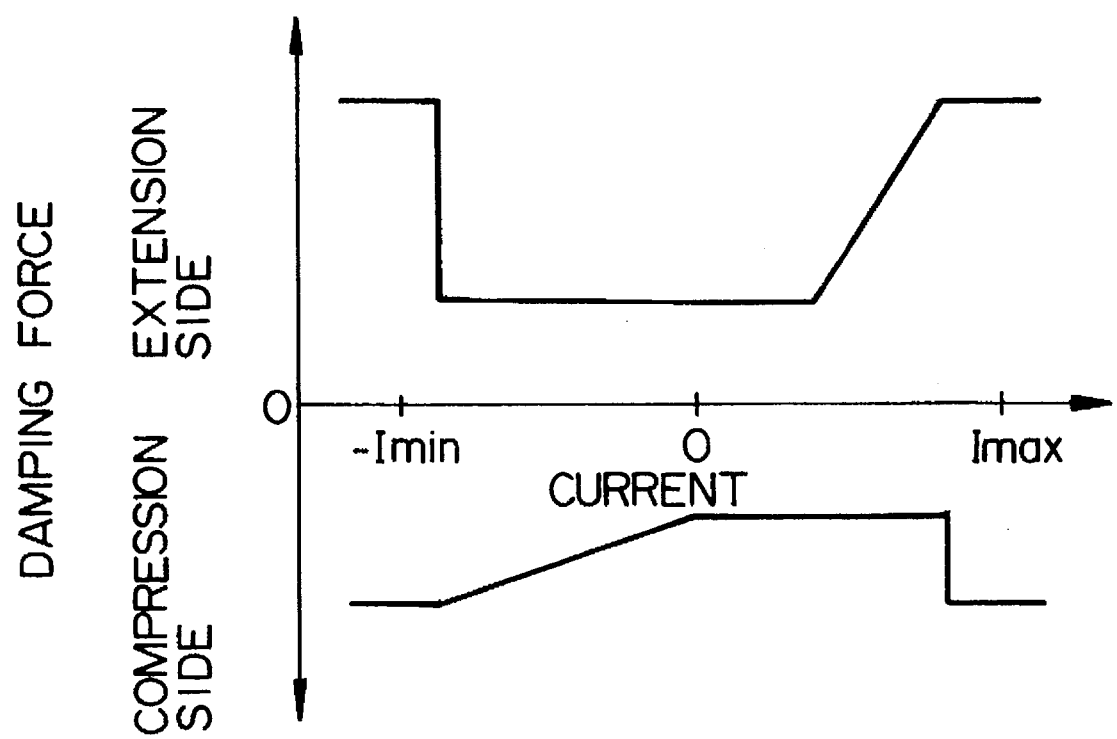
FIG. 15 is a graph showing a damping force feature of a further alteration of the eighth embodiment.

In such a case, as shown in FIG. 14, when no current is applied to the actuator, the damping force feature becomes both the "extension-hard" and the "compression-hard". And, within the predetermined current range from $I_{min}$ to $I_{max}$, as the current (thrust force of the actuator 204) is increased, the extension side is changed from "soft" to "hard" and the compression side is changed from "hard" to "soft".

Alternatively, springs may be disposed on both sides of the spool 224 to bias the spool to an intermediate position and an actuator of a push/pull type may be used to push or pull the spool in accordance with the magnitude and direction of the supplied current, thereby adjusting the damping force. In this case, when the spool is shifted to the left end position or the right end position, the extension side guide port 219 or 220 and the compression side guide port 222 or 223 are closed by the land portions 224a, 224b, 224c of the spool 224, and, by shifting the spool to the end position by applying the maximum current to the actuator upon the fail safe operation of the control system for the actuator, both the extension side damping force and the compression side damping force can be fixed to "hard" upon the fail safe operation of the control system for the actuator, thereby maintaining the steering stability of the vehicle in a good condition (refer to FIG. 15).

Next, a ninth embodiment of the present invention will be explained with reference to FIGS. 16 and 17. Since a hydraulic damper according to the ninth embodiment is similar to that of the eighth embodiment except for a construction of a disc valve acting as a damping valve of a damping force generating mechanism, the damping force generating mechanism of the ninth embodiment alone is illustrated, and the same elements as those in the eighth embodiment are designated by the same reference numerals, and only the differences will be mainly explained.

Figure 16:
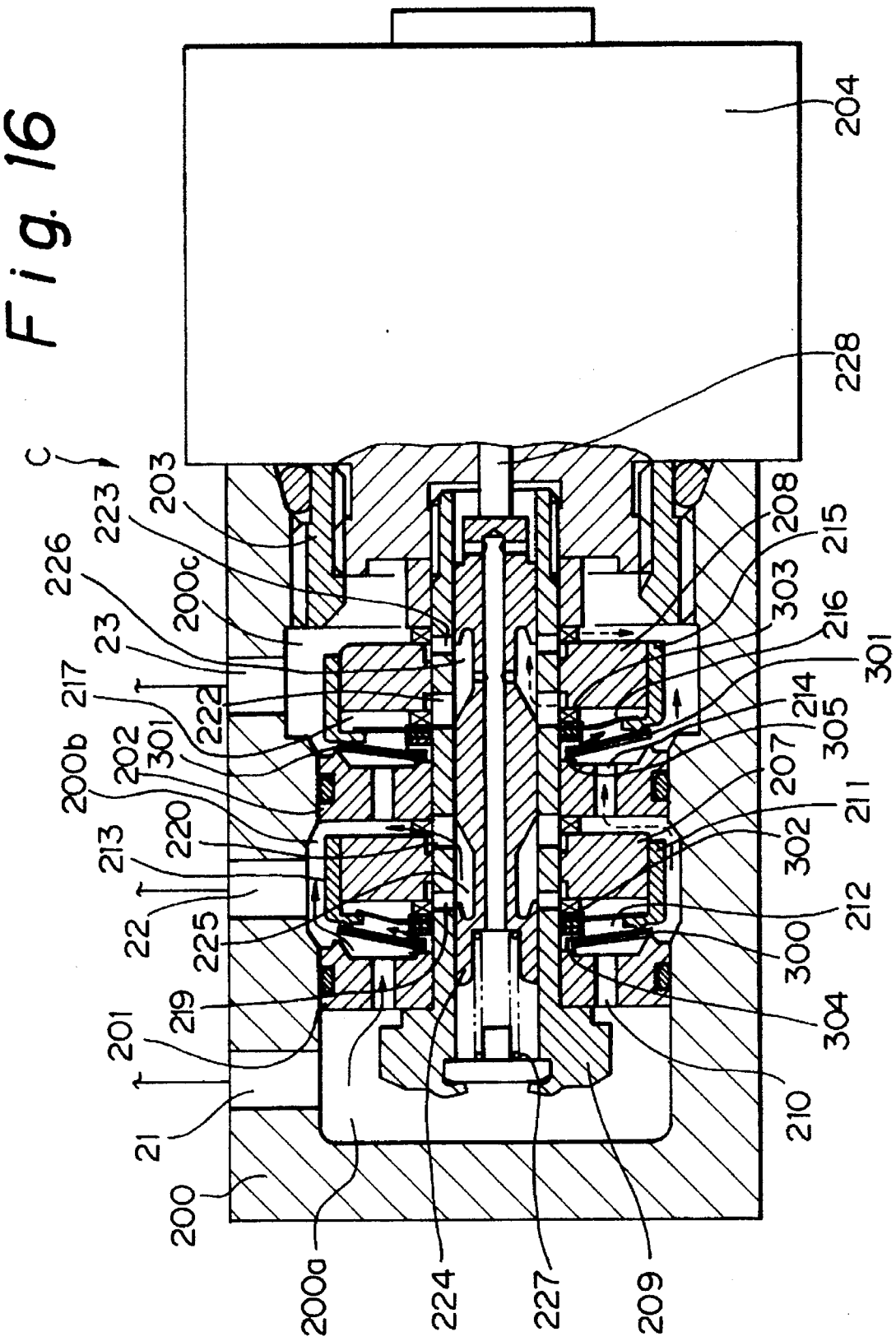
FIG. 16 is a longitudinal sectional view of damping force generating mechanism of a hydraulic damper of damping force adjusting type according to a ninth embodiment of the present invention.
Figure 17:
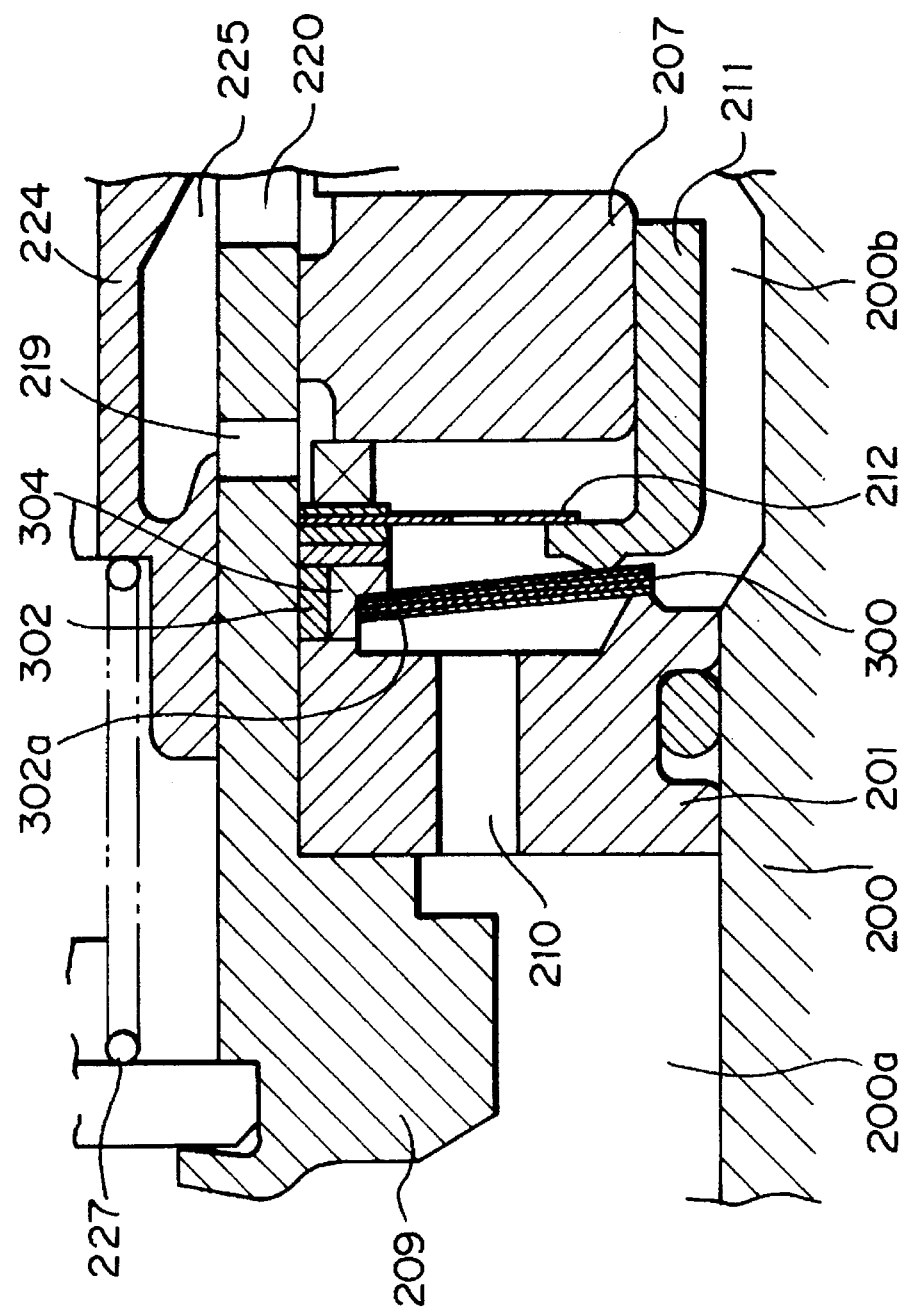
FIG. 17 is an enlarged sectional view of an extension side disc valve of the apparatus of FIG. 16.

As shown in FIGS. 16 and 17, in a damping force generating mechanism C of a hydraulic damper of damping force adjusting type according to the ninth embodiment, disc valves 300, 301 mounted on the valve members 201, 202 comprise a plurality (four in the illustrated embodiment) of annular laminated leaf springs, and one side surface at the outer peripheral portion of each of the disc valves is urged against the annular valve seat on the associated one of the valve members 201, 202, and the other surface at the inner peripheral portion of the disc valve is pressed against the associated one of stepped portions 302a, 303a (only 302a is shown in FIG. 17) of annular retainers 302, 303 fitted on the guide member 209 so that the disc valves are held on the valve members 201, 202. In this case, by maintaining the disc valves 300, 301 in a flexed condition by the stepped portions 302a, 303a and the valve seats of the valve members 201, 202, initial loads are applied to the disc valves 300, 301. The flange portions of the seal members 211, 215 abut against the upper surfaces (facing right in FIG. 16) of the outer peripheral portions of the disc valves 300, 301. The retainers 302, 303 are provided with notches 304, 305 disposed along the stepped portions 302a, 303a, so that extension side and compression side fixed orifices for communicating the extension side and compression side back pressure chambers 213, 217 with the oil chambers 200a, 200b, respectively, are defined between the notches 304, 305 and the inner peripheral edges of the disc valves.

With this arrangement, the disc valves 300, 301 are flexed and opened under the action of the pressures in the oil chambers 200a, 200b. By changing the flow areas of the guide ports 219, 223 by shifting the spool 224 (this fact differs from the eighth embodiment), the pressures in the back pressure chambers 213, 217 can be changed, thereby adjusting the valve feature. In this way, the hydraulic damper of the damping force adjusting the according to the ninth embodiment can achieve the same technical effect as that of the eighth embodiment. In FIG. 16, the arrows shown by the solid line indicate oil flow in the extension stroke, and the arrows shown by the broken line indicate oil flow in the compression stroke.

Since the inner peripheral portions of the disc valves 300, 301 are merely urged against the stepped portions 302a, 303a of the retainers 302, 303 and are not clamped (or pinched) by spacers and the like, outer peripheral portions of the disc valves are easily flexed and opened. Thus, since the low valve opening pressures can easily be set, the setting range for setting the damping force feature can be widened.

Since the orifices are defined by the notches 304, 305 of the retainers 302, 303 and are not formed in the disc valves 300, 301, the disc valves 300, 301 can be formed as a laminated structure, and the valve feature can easily be set. By forming the disc valves 300, 301 as a laminated structure, self-excited vibration can be suppressed by friction between the disc valves, thereby preventing the occurrence of noise. Further, if a disc valve having an orifice is formed as a laminated structure, laminated elements must be correctly positioned to correctly define the orifice, thereby making the assembly of a disc valve difficult. In contrast, according to the illustrated embodiment, such a problem does not occur.

Figure 18:
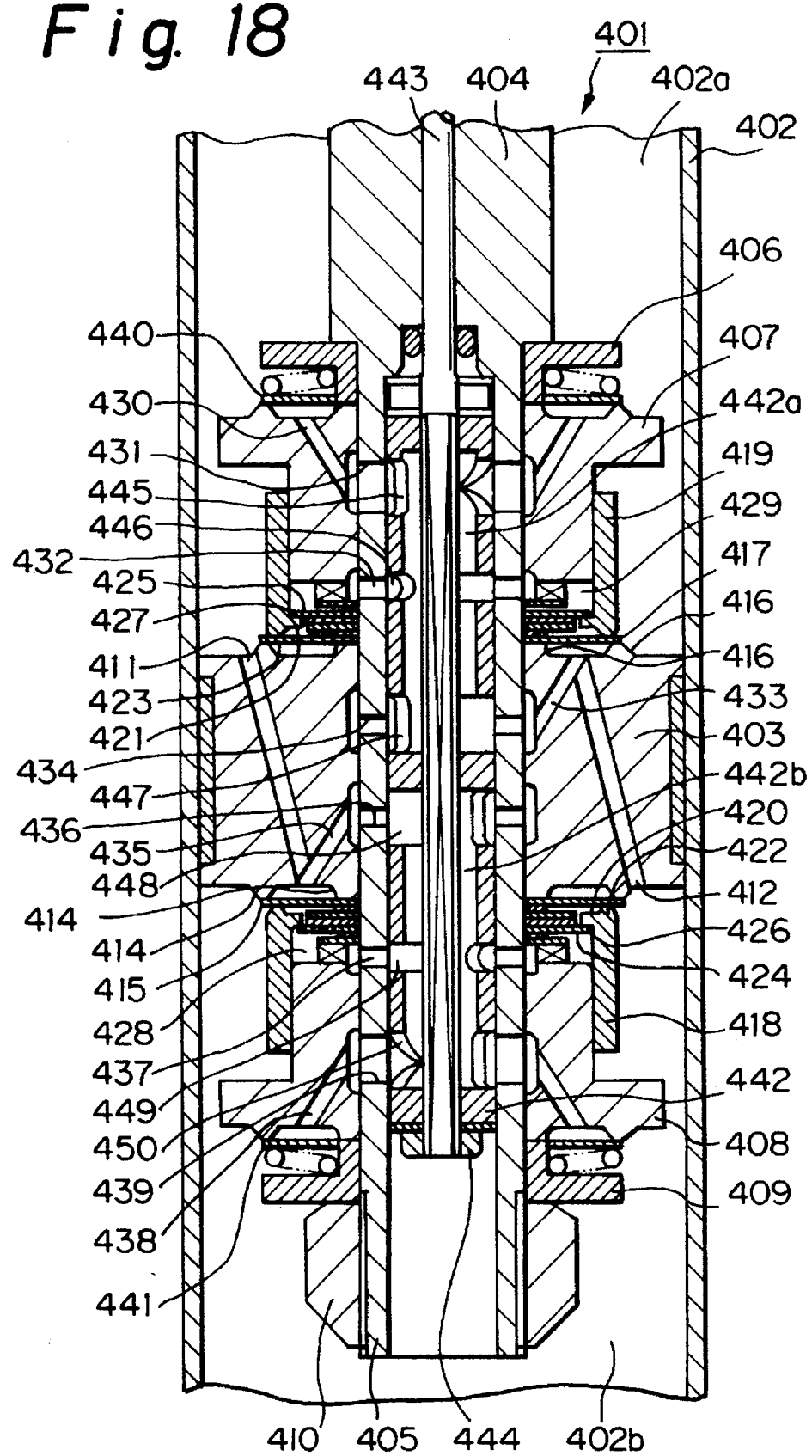
FIG. 18 is a longitudinal sectional view showing a main portion of a hydraulic damper of a damping force adjusting type according to a tenth embodiment of the present invention.
Figure 19:
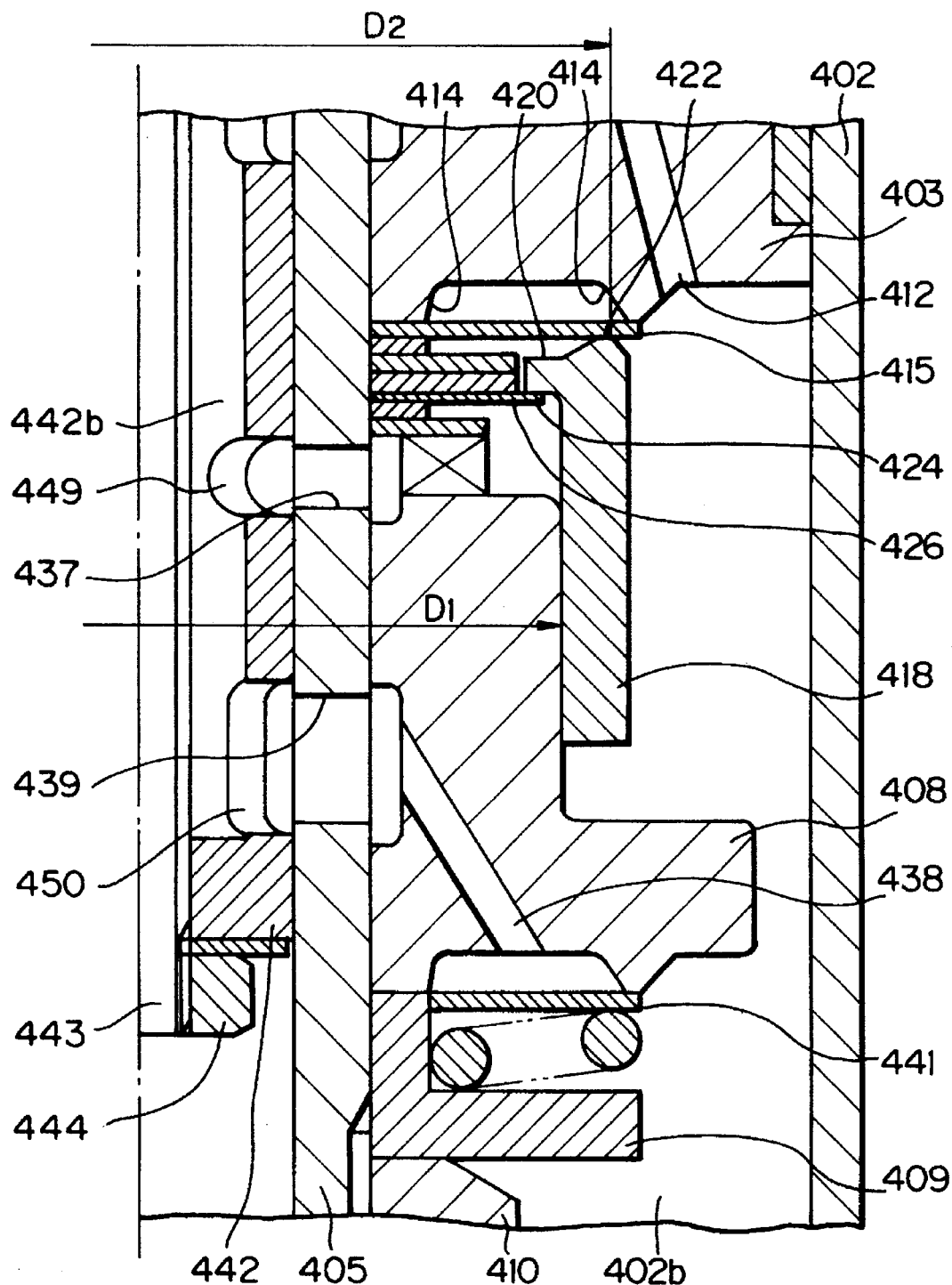
FIG. 19 is an enlarged sectional view of a portion of FIG. 18.

Next, the tenth embodiment of the present invention will be explained with reference to FIGS. 18 and 19. As shown in FIGS. 18 and 19, in a hydraulic damper 401 of damping force adjusting type according to the tenth embodiment, a piston 403 is slidably mounted within a cylinder 402 containing hydraulic fluid, and the interior of the cylinder 402 is divided into an upper cylinder chamber 402a and a lower cylinder chamber 402b by the piston 403. One end of a piston rod 404 is connected to the piston 403 and the other end of the piston rod 404 extends out of the cylinder 402 through a rod guide (not shown) and a seal member (not shown) attached to an upper end of the cylinder 402. A reservoir (not shown) for compensating change in the volume of the cylinder 402 due to extension and retraction of the piston rod 404 by compression and expansion of gas is connected to the cylinder 402.

The piston rod 404 is provided at its one end with a cylindrical guide portion 405 having a diameter smaller than the diameter of a sliding portion of the piston rod 404, and a step is formed between these portions. A retainer 406, seal guide member 407, piston 403, seal guide member 408 and retainer 409 are fitted onto the guide portion 405 in this order starting from the stepped portion. By threading a nut 410 onto a free end of the guide portion 405, these elements 406-409 and 403 are retained on the piston rod 404.

The piston 403 is provided with a plurality of extension side passages 411 and compression side passages 412 (only one passage 411 and only one passage 412 are shown) for communicating the upper and lower cylinder chambers 402a, 402b with each other, which passages are distributed along a circumferential direction of the piston. The extension side passages 411 are open to the upper cylinder chamber 402a near an outer periphery of the piston 403 and open to the lower cylinder chamber 402b near an inner periphery of the piston 403. The compression side passages 412 are open to the upper cylinder chamber 402a near the inner periphery of the piston 403 and open to the lower cylinder chamber 402b near the outer periphery of the piston 403.

Annular valve seats 414 are protruded from a lower surface (which faces the lower cylinder chamber 402b) of the piston 403 with the openings of the extension side passages 411 disposed between these seats, and an extension side disc valve 415 is disposed in a confronting relation to the valve seats 414. The disc valve 415 has an inner peripheral portion pinched and held between the piston 403 and the seal guide member 408 and is opened when its outer portion is flexed by the pressure in the extension side passages 411 communicated with the upper cylinder chamber 402a to control the oil flow in accordance with the opening degree of the disc valve, thereby generating the damping force. However, the disc valve 415 prevents the oil flow from the lower cylinder chamber to the upper cylinder chamber.

Annular valve seats 416 are protruded from an upper surface (which faces the upper cylinder chamber 402a) of the piston 403 with the openings of the compression side passages 412 disposed between these seats, and a compression side disc valve 417 is disposed in a confronting relation to the valve seats 416. The disc valve 417 has an inner peripheral portion pinched and held between the piston 403 and the seal guide member 407 and is opened when its outer portion is flexed by the pressure in the compression side passages 412 communicated with the lower cylinder chamber 402b to control the oil flow in accordance with the opening degree of the disc valve, thereby generating the damping force. However, the disc valve 417 prevents the oil flow from the upper cylinder chamber to the lower cylinder chamber.

The seal guide members 407, 408 are annular in shape and have openings through which the piston rod 404 extends, and substantially cylindrical seal members 418, 419 are slidably fitted onto the seal guides members 408, 407, respectively. The seal members 418, 419 are provided at their one ends with flanges 420, 421 extending radially inwardly. The flanges 420, 421 are provided at their outer surfaces with annular abutment portions 422, 423 against which the extension side disc valve 415 and the compression side disc valve 417 are urged, respectively. Further, the flanges 420, 421 are provided at their inner surfaces with annular seal portions 424, 425.

Around the guide portion 405 of the piston rod 404, there is provided a disc shaped leaf spring 426 having an inner peripheral portion pinched and held between the disc valve 415 and the seal guide member 408 and an outer peripheral portion urged against the seal portion 424 of the seal member 418 in a liquid-tight manner to urge the seal member 418 against the extension side disc valve 415, thereby applying an initial load to the disc valve. There is also provided a disc shaped leaf spring 427 having an inner peripheral portion pinched and held between the disc valve 417 and the seal guide member 407 and an outer peripheral portion urged against the seal portion 425 of the seal member 419 in a liquid-tight manner to urge the seal member 419 against the compression side disc valve 417, thereby applying an initial load to the disc valve. In this way, since both ends of the seal members 418, 419 are closed by the seal guide portions 407, 408 and the leaf springs 426, 427, back pressure chambers 428, 429 are defined within the seal members 418, 419 between the seal guide portions 407, 408 and the leaf springs 426, 427.

As shown in FIG. 19, since the diameter D2 of the abutment portion 422 is greater than an inner diameter of the seal member 418 (i.e. regarding the pressure in the lower cylinder chamber 402b, a pressure receiving area of the seal member at a side of the retainer 409 is greater than a pressure receiving area of the seal member at a side of the disc valve 415), the seal member 418 is always biased toward the disc valve 415 under the action of the pressure in the lower cylinder chamber 402b so as not to be separated from the disc valve 415. Similarly, the seal member 419 is always biased toward the disc valve 417 under the action of the pressure in the upper cylinder chamber 402a so as not to be separated from the disc valve 417. With this arrangement, a delay in response of the adjustment of the valve opening pressure to the change in stroke direction of the piston rod 404 can be prevented.

The guide portion 405 of the piston rod 404 is provided at its side wall with a guide port 431 communicated with the upper cylinder chamber 402a through a passage 430 formed in the seal guide member 407, a guide port 432 communicated with the back pressure chamber 429, a guide port 434 communicated with the lower cylinder chamber 402b through a passage 433 formed in the piston 403 and the compression side passages 412, a guide port 436 communicated with the upper cylinder chamber 402a through a passage 435 formed in the piston 403 and the extension side passages 411, a guide port 437 communicated with the back pressure chamber 428, and a guide port 439 communicated with the lower cylinder chamber 402b through a passage 438 formed in the seal guide member 408. The retainer 406 has a check valve 440 for permitting only the oil flow from the passage 430 to the upper cylinder chamber 402a, and the retainer 409 has a check valve 441 for permitting only the oil flow from the passage 438 to the lower cylinder chamber 402b.

A cylindrical shutter 442 is rotatably received within the guide portion 405. One end of an operation rod 443 is connected to the shutter 442 by a nut 444, and the other end of the operation rod 443 passes through the piston rod 404 and extends out of the damper so that the shutter 442 can be rotated from outside via the operation rod 443.

Shutter ports 445, 446, 447, 448, 449, 450 which can be aligned with the guide ports 431, 432, 434, 436, 437, 439, respectively, are formed in a side wall of the shutter 442. The interior of the shutter 442 is divided into a shutter chamber 442a and a shutter chamber 442b. The shutter ports 445, 446, 447 are communicated with each other through the shutter chamber 442a, and the shutter ports 448, 449, 450 are communicated with each other through the shutter chamber 442b. A variable orifice of compression side is constituted by the guide port 431 and the shutter port 445, and a variable orifice of extension side is constituted by the guide port 439 and the shutter port 450, so that flow areas of these orifices can be changed freely by rotating the shutter 442. Incidentally, the guide ports 432, 434, 436, 437 are always communicated with the shutter ports 446, 447, 448, 449, respectively, with a constant flow area, regardless of the angular position of the shutter 442. The guide ports 434, 436 constitute fixed orifices.

The extension side back pressure chamber 428 is communicated with the shutter chamber 442b through the guide port 437 and the shutter port 449, and then is communicated with the upper cylinder 402a ("upstream side" in the extension stroke) through the shutter port (upstream passage) 448, guide port (variable orifice) 436, passage 435 of the piston 403 and extension side passages 411, and, also communicated with the lower cylinder 402b ("downstream side" in the extension stroke) through the shutter port (downstream passage) 450, guide port (variable orifice) 439 and passage 438.

The compression side back pressure chamber 429 is communicated with the shutter chamber 442a through the guide port 432 and the shutter port 446, and then is communicated with the lower cylinder 402b ("upstream side" in the compression stroke) through the shutter port (upstream passage) 447, guide port (variable orifice) 434, passage 433 of the piston 403 and compression side passages 412, and, also communicated with the upper cylinder 402a ("downstream side" in the extension stroke) through the 5' shutter port (downstream passage) 445, guide port (variable orifice) 431 and passage 430.

Next, an operation of the hydraulic damper according to the tenth embodiment having the above-mentioned construction will be explained.

During the extension stroke of the piston rod 404, the hydraulic fluid in the upper cylinder chamber 402a is pressurized by the shifting movement of the piston 403, with the result that the liquid opens the check valve 441 and flows from the upper cylinder chamber into the lower cylinder chamber 402b through the extension side passages 411, passage 435, guide port 436, shutter port 448, shutter chamber 442b, shutter port 450, guide port 439 and passage 438. When the pressure in the upper cylinder chamber 402a reaches the valve opening pressure for the disc valve 415, the latter is opened to make the fluid directly flow from the extension side passages 411 to the lower cylinder chamber 402b.

Before the disc valve 415 is opened, when the piston speed is small, a damping force depending upon the orifice feature is generated in accordance with the flow area of the variable orifice constituted by the guide port 439 and the shutter port 450. When the piston speed is increased so that the pressure in the upper cylinder chamber 402a is also increased to open the disc valve 415, a damping force depending upon the valve feature is generated in accordance with the opening degree of the disc valve. By changing the flow area of the variable orifice by rotating the shutter 442 via the operation rod 443, the damping force feature can be adjusted.

In this case, since the smaller the flow area of the variable orifice is, the greater the pressure loss across the orifice becomes, and the pressure in the upstream shutter chamber 442b, i.e. the back pressure chamber 428 is increased to urge the seal member 418 against the back surface of the disc valve 415. As a result, the valve opening pressure for this disc valve 415 is increased. On the other hand, since the greater the flow area of the variable orifice is, the smaller the pressure in the back pressure chamber 428 becomes, and the valve opening pressure for the disc valve 415 is decreased. Accordingly, when the flow area of the variable orifice is changed by rotating the shutter 442, since the orifice feature and the valve feature are changed simultaneously, a great range of change in the damping force can be achieved through the low piston speed to the high piston speed, and thus, the adjusting range for adjusting the damping force feature can be widened.

During the compression stroke of the piston rod, the hydraulic liquid in the lower cylinder chamber 402b is pressurized by the shifting movement of the piston 403 to make the hydraulic fluid flow from the lower cylinder chamber 402b into the upper cylinder chamber 402a through the compression side passages 412, passage 433, guide port 434, shutter port 447, shutter chamber 442a, shutter port 445, guide port 431, passage 430 and the opened check valve 440. When the pressure in the lower cylinder chamber 402b reaches the valve opening pressure for the disc valve 417, the latter is opened to make the fluid directly flow from the compression side passages 412 to the upper cylinder chamber 402a.

Before the disc valve is opened, when the piston speed is small, the damping force depending upon the orifice feature is generated in accordance with the flow area of the variable orifice constituted by the guide port 431 and the shutter port 445. When the piston speed is increased so that the pressure in the lower cylinder chamber 402b is also increased to open the disc valve 417, the damping force depending upon the valve feature is generated in accordance with the opening degree of the disc valve. By changing the flow area of the variable orifice by rotating the shutter 442 via the operation rod 443, the damping force feature can be adjusted.

In this case, similar to the extension stroke, since the pressure in the compression side back pressure chamber 429 is changed in accordance with the flow area of the variable orifice, the valve opening pressure for the disc valve 417 is also changed. Thus, when the flow area of the variable orifice is changed by rotating the shutter 442, since the orifice feature and the valve feature are changed simultaneously, a great range of change in the damping force can be achieved through the low piston speed to the high piston speed, and thus, the adjusting range for adjusting the damping force feature can be widened.

Further, by changing the flow area of the extension side variable orifice constituted by the guide port 439 and the shutter port 450 and the flow area of the compression side variable orifice constituted by the guide port 431 and the shutter port 445, respectively, by rotating the shutter 442, the extension side damping force feature and the compression side damping force feature can be obtained independently.

In this case, for example, by selecting the guide ports and the shutter ports so that the flow area of the extension side variable orifice becomes greater while the flow area of the compression side variable orifice becomes smaller, and vice versa, in accordance with the angular position of the shutter, a combination of damping force features which differ from each other at the extension side and at the compression side (for example, a combination of extension-hard and compression-soft, or a combination of extension-soft and compression-hard) can be set.

In connection with the fact that the opening degrees of the disc valves 415, 417 are controlled by urging the abutment portions 422, 423 of the seal members 418, 419 against the back surfaces of the disc valves 415, 417 under the action of the pressures in the back pressure chambers 428, 429, since the leaf springs 426, 427 are used, the following advantage can be obtained. That is to say, since members urged against the seal portions 424, 425 of the seal members 418, 419 under the action of the pressures in the back pressure chambers 428, 429 are leaf springs which are previously loaded, the sealing ability can be improved. Thus, even when the piston speed is small (i.e. pressures in the back pressure chambers 42B, 429 are low), the reduction in the sealing ability of the back pressure chambers 428, 429 can be positively prevented, thereby generating the stable damping force.

Next, an eleventh embodiment of the present invention will be explained with reference to FIGS. 20 and 21.

Figure 20:
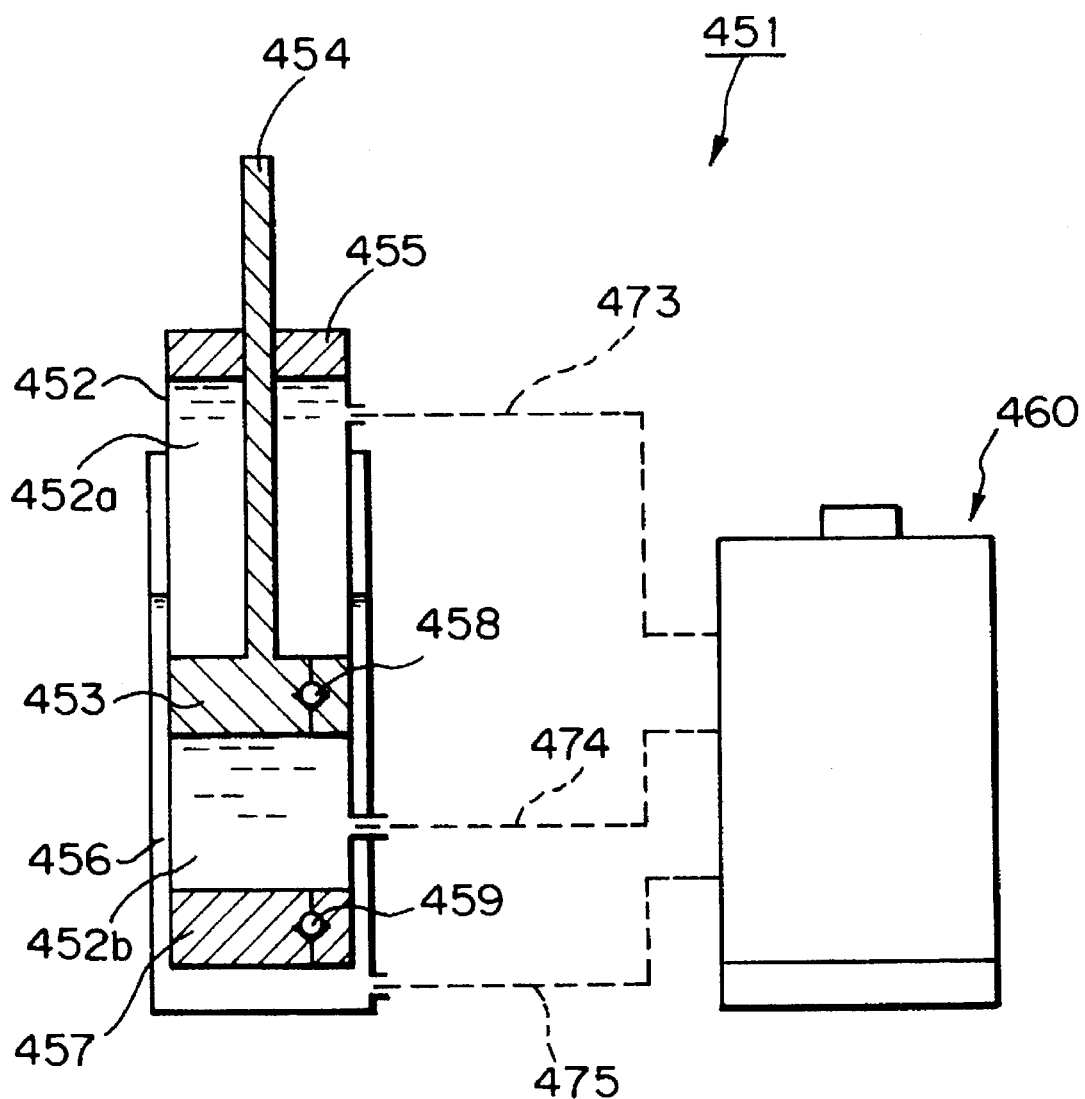
FIG. 20 is a circuit diagram showing a hydraulic damper of a damping force adjusting type according to an eleventh embodiment of the present invention.

As shown in FIG. 20, in a hydraulic damper 451 of the damping force adjusting type according to the eleventh embodiment, a piston 453 is slidably mounted within a cylinder 452 containing hydraulic fluid therein, and the interior of the cylinder 452 is divided into an upper cylinder chamber 452a and a lower cylinder chamber 452b by the piston 453. One end of a piston rod 454 is connected to the piston 453 and the other end of the piston rod 454 is inserted into a guide seal 455 mounted on an end of the cylinder 452 and extends out of the cylinder. A reservoir 456 containing hydraulic fluid and gas is formed around the cylinder 452 and is communicated with the lower cylinder chamber 452b through a base valve 457 provided at the bottom of the cylinder.

The piston 453 is provided with a check valve 458 for permitting only the oil flow from the lower cylinder chamber 452b to the upper cylinder chamber 452a, and the base valve 457 is provided with a check valve 459 for permitting only the oil flow from the reservoir 456 to the lower cylinder chamber 452b. A damping force generating mechanism 460 is connected to the cylinder 452.

Figure 21:
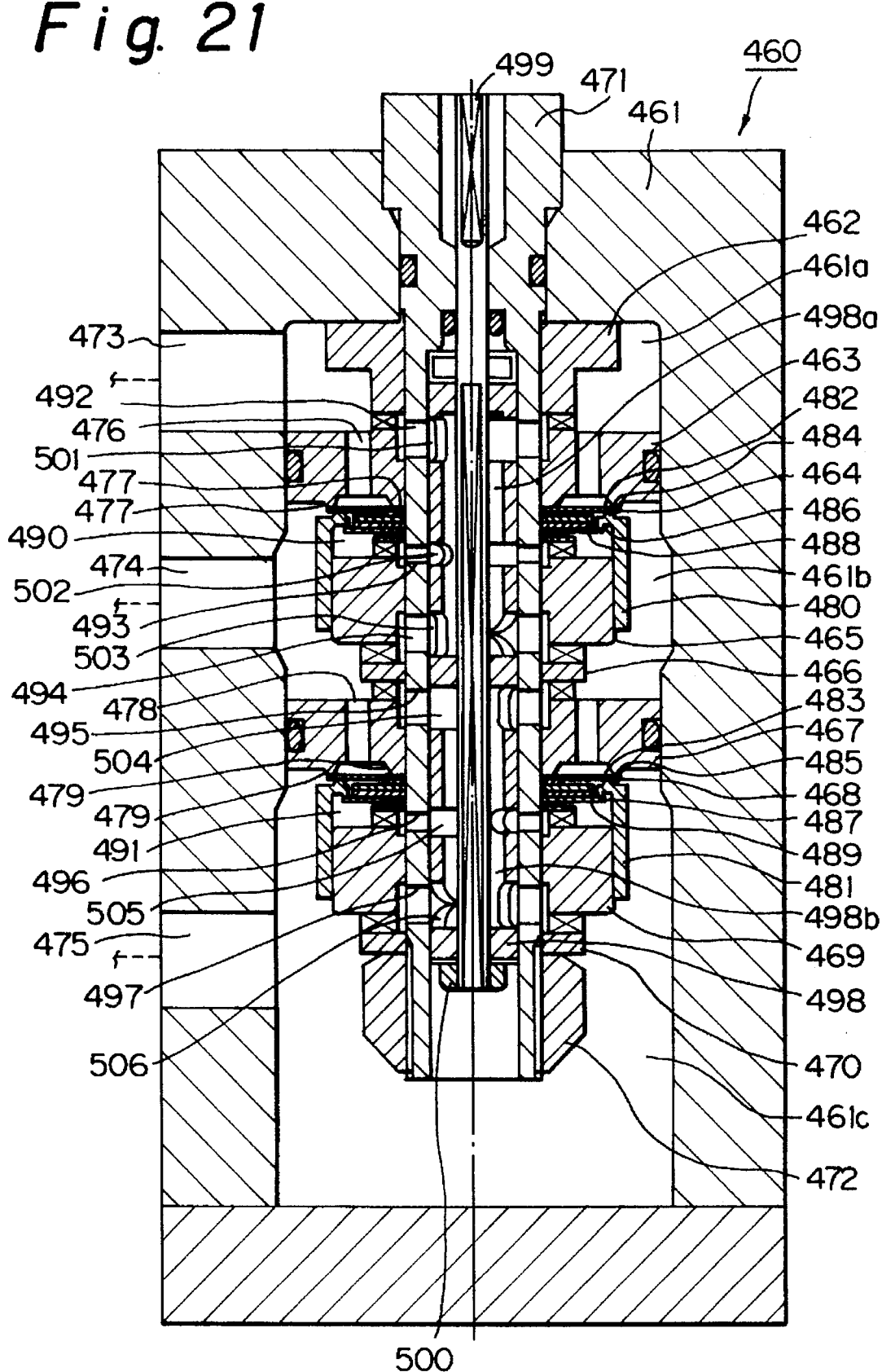
FIG. 21 is a longitudinal sectional view of a damping force generating mechanism of the apparatus of FIG. 20.

As shown in FIG. 21, in the damping force generating mechanism 460, within a substantially cylindrical case 461 having a base wall, there are disposed a spacer 462, a valve member 463, a disc valve 464, a seal guide member 465, a spacer 466, a valve member 467, a disc valve 468, a seal guide member 469 and a spacer 470 in this order. These elements 462–470 are fixed around a substantially cylindrical guide member 471 having a base inserted into the mechanism through the base wall of the case 461 by tightening a nut 472 against the guide member 471 from below.

The valve members 463, 467 fitted within the case 461 divide the interior of the case 461 into three oil chambers 461a, 461b, 461c. The case 461 is provided with an oil passage 473 for communicating the oil chamber 461a with the upper cylinder chamber 452a, an oil passage 474 for communicating the oil chamber 461b with the lower cylinder chamber 452b, and an oil passage 475 for communicating the oil chamber 461c with the reservoir 456.

The valve member 463 is provided with an extension side passage 476 for communicating the oil chamber 461a with the oil chamber 461b (i.e. communicating the upper and lower cylinder chambers 452a, 452b with each other through the oil passages 473, 474). Annular valve seats 477 are protruded from an end surface (which faces the oil chamber 461b) of the valve member 463 with an opening of the extension side passage 476 disposed between these seats, and the disc valve 464 acting as a damping valve of the extension side is disposed in a confronting relation to the valve seats 477. The disc valve 464 is opened when its outer portion is flexed by the pressure of oil in the extension side passage 476 communicated with the oil chamber 461a, with the result that the oil can flow from the oil chamber 461a to the oil chamber 461b while generating the damping force in accordance with the opening degree of the disc valve. Oil flow from the oil chamber 461b to the oil chamber 461a is prevented.

The valve member 467 is provided with a compression side passage 478 for communicating the oil chamber 461b with the oil chamber 461c i.e. communicating the lower cylinder chamber 452b with the reservoir 456 through the oil passages 474, 475). Annular valve seats 479 are protruded from an end surface (which faces the oil chamber 461c) of the valve member 467 with an opening of the compression side passage 478 disposed between these seats, and the disc valve 468, acting as a damping valve of the compression side, is disposed in a confronting relation to the valve seat 479. The disc valve 468 is opened when its outer portion is flexed by the pressure of oil in the compression side passage 478 communicated with the oil chamber 461b, with the result that the oil can flow from the oil chamber 461b to the oil chamber 461c while generating the damping force in accordance with the opening degree of the disc valve. The oil flow from the oil chamber 461c to the oil chamber 461b is prevented.

The seal guide members 465, 469 are annular in shape and have openings through which the guide member 471 extends, and substantially cylindrical seal members 480, 481 are slidably fitted onto the seal guide members 465, 469, respectively. The seal members 465, 469 are provided at their one ends with flanges 482, 483 extending radially inwardly. The flanges 482, 483 are provided at their outer surfaces with annular abutment portions 484, 485 against which the extension side disc valve 464 and the compression side disc valve 468 are pressed, respectively. Further, the flanges 482, 483 are provided at their inner surfaces with annular seal portions 486, 487.

Around the guide member 471, there is provided a disc shaped leaf spring 488 having an inner peripheral portion pressed and held between the disc valve 464 and the seal guide member 465 and an outer peripheral portion pressed against the seal portion 486 of the seal member 480 in a liquid-tight manner to urge the seal member 480 against the extension side disc valve 464. There is also provided a disc shaped leaf spring 489 having an inner peripheral portion pinched and held between the disc valve 468 and the seal guide member 469 and an outer peripheral portion pressed against the seal portion 487 of the seal member 481 in a liquid-tight manner to urge the seal member 481 against the compression side disc valve 468. In this way, since both ends of the seal members 408, 481 are closed by the seal guide members 465, 469 and the leaf springs 488, 489, back pressure chambers 490, 491 are defined within the seal 469 and members 480, 481 between the seal guide members 465, the leaf springs 488, 489.

As is in the tenth embodiment, since the diameter of each of the abutment portions 484, 485 is greater than an inner diameter of each of the seal members 480, 481, the seal members are always biased toward the disc valves 464, 468 under the action of the pressures in the oil chambers 461b, 461c so as not to be separated from the disc valves 464, 468.

The guide member 471 is provided at its side wall with a guide port 492 communicated with the oil chamber 461a, a guide port 493 communicated with the back pressure chamber 490, guide ports 494, 495 communicated with the oil chamber 461b, a guide port 496 communicated with the back pressure chamber 491, and a guide port 497 communicated with the oil chamber 461c.

A cylindrical shutter 498 is rotatably received within the guide member 471. One end of an operation rod 499 is connected to the shutter 498 by a nut 500, and the other end of the operation rod 499 extends out of the damper so that the shutter 498 can be rotated from outside via the operation rod 499.

Shutter ports 501, 502, 503, 504, 505, 506 which can be aligned with the guide ports 492, 493, 494, 495, 496, 497, respectively, are formed in a side wall of the shutter 498. The interior of the shutter 498 is divided into a shutter chamber 498a and a shutter chamber 498b. The shutter ports 501, 502, 503 are communicated with each other through the shutter chamber 498a, and the shutter ports 504, 505, 506 are communicated with each other through the shutter chamber 498b.

The extension side back pressure chamber 490 is communicated with the shutter chamber 498a through the guide port 493 and the shutter port 502, and then is communicated with the oil chamber 461a and accordingly the upper cylinder chamber 452a ("upstream side" in the extension stroke) through the shutter port (upstream passage) 492 and the guide port (fixed orifice) 501, and, also communicated with the oil chamber 461b and accordingly the lower cylinder 452b ("downstream side" in the extension stroke) through the shutter port (downstream passage) 503 and the guide port (variable orifice) 494.

The compression side back pressure chamber 491 is communicated with the shutter chamber 498b through the guide port 496 and the shutter port 505, and then is communicated with the oil chamber 461b and accordingly the lower cylinder chamber 452b ("upstream side" in the compression stroke) through the shutter port (upstream passage) 504 and guide port (fixed orifice) 495, and, also communicated with the oil chamber 461c and accordingly the reservoir 456 ("downstream side" in the extension stroke) through the shutter port (downstream passage) 506 and guide port (variable orifice) 497.

The guide port 494 and the shutter port 503 constitute an extension side variable orifice, and the guide port 497 and the shutter port 506 constitute a compression side variable orifice, so that the flow areas of the orifices can freely be changed by rotating the shutter 498. The guide ports 492, 493, 495, 496 are communicated with the shutter ports 501, 502, 504, 505, respectively, with a constant flow area, regardless of the angular position of the shutter 498. The guide ports 492, 495 constitute fixed orifices.

Next, an operation of the hydraulic damper according to the eleventh embodiment having the above-mentioned construction will be explained.

During the extension stroke of the piston rod 454, the check valve 458 is closed by the shifting movement of the piston 453 to pressurize the hydraulic fluid in the upper cylinder chamber 452a, with the result that the liquid flows from the upper cylinder chamber into the lower cylinder chamber 452b through the oil passage 473, oil chamber 461a, guide port 492, shutter port 501, shutter chamber 498a, shutter port 503, guide port 494, oil chamber 461b and oil passage 474. When the pressure in the upper cylinder chamber 452a reaches the valve opening pressure for the disc valve 464, the latter is opened to make the fluid directly flow from the extension side passage 476 to the oil chamber 461b. On the other hand, as the piston rod 454 is extended, an amount of the hydraulic liquid corresponding to a volume required by the retraction of the piston rod from the cylinder 452 is supplied to the lower cylinder chamber 452b from the reservoir 456 through the check valve 459 due to expansion of gas.

Before the disc valve 464 is opened, when the piston speed is small, a damping force depending upon the orifice feature is generated in accordance with the flow area of the variable orifice constituted by the guide port 494 and the shutter port 503. When the piston speed is increased so that the pressure in the upper cylinder chamber 452a is also increased to open the disc valve 464, a damping force depending upon the valve feature is generated in accordance with the opening degree of the disc valve. By changing the flow area of the variable orifice by rotating the shutter 498 via the operation rod 499, the damping force feature can be adjusted.

As in the tenth embodiment, the pressure in the back pressure chamber 490 of the extension side is changed in accordance with the flow area of the variable orifice and the valve opening pressure for the disc valve 464 is changed. Accordingly, when the flow area of the variable orifice is changed by rotating the shutter 498 via the operation rod 499, since the orifice feature and the valve feature are changed simultaneously, the great range of change in the damping force can be achieved through the low piston speed to the high piston speed, and thus, the adjusting range for adjusting the damping force feature can be widened.

During the compression stroke of the piston rod, since the check valve 458 is opened by the shifting movement of the piston 453 to make the fluid directly flow from the lower cylinder chamber 452b to the upper cylinder chamber 452a, the pressure in the upper cylinder chamber 452a becomes the same as the pressure in the lower cylinder chamber 452b, with the result that there is no oil flow between the oil passages 473 and 474 of the damping force generating mechanism 460.

On the other hand, the check valve 459 of the base valve 457 is closed. As the piston rod 454 is retracted, since the hydraulic liquid is pressurized by the insertion of the piston rod into the cylinder 452, the hydraulic fluid flows from the lower cylinder chamber 452b into the reservoir 456 through the oil passage 474, oil chamber 461b, guide port 495, shutter port 504, shutter chamber 498b, shutter port 506, guide port 497, oil chamber 461c and oil passage 475, thereby compressing the gas. When the pressure in the cylinder 452 reaches the valve opening pressure for the disc valve 468, the latter is opened to make the fluid directly flow from the compression side passage 478 to the oil chamber 461c.

Before the disc valve 468 is opened, when the piston speed is small, the damping force depending upon the orifice feature is generated in accordance with the flow area of the variable orifice constituted by the guide port 497 and the shutter port 506. When the piston speed is increased so that the pressure in the cylinder 452 is also increased to open the disc valve 468, the damping force depending upon the valve feature is generated in accordance with the opening degree of the disc valve. By changing the flow area of the variable orifice by rotating the shutter 498 via the operation rod 499, the damping force feature can be adjusted.

In this case, similar to the extension stroke, since the pressure in the compression side back pressure chamber 491 is changed in accordance with the flow area of the variable orifice, the valve opening pressure for the disc valve 468 is also changed. Thus, when the flow area of the variable orifice is changed by rotating the shutter 498, since the orifice feature and the valve feature are changed simultaneously, a great range of change in the damping force can be achieved through the low piston speed to the high piston speed, and thus the adjusting range for adjusting the damping force feature can be widened.

Further, by changing the flow area of the extension side variable orifice constituted by the guide port 494 and the shutter port 503 and the flow area of the compression side variable orifice constituted by the guide port 497 and the shutter port 506, respectively, by rotating the shutter 498, the extension side damping force feature and the compression side damping force feature can be obtained independently.

In this case, for example, by selecting the guide ports and the shutter ports so that the flow area of the extension side variable orifice becomes greater while the flow area of the compression side variable orifice becomes smaller and vice versa, in accordance with the angular position of the shutter, a combination of the damping force features which differ from each other at the extension side and at the compression side (for example, a combination of extension-hard and compression-soft, or a combination of extension-soft and compression-hard) can be set.

During the compression stroke, since the damping force is generated by the flow resistance of the variable orifice (guide port 497 and shutter port 506) and the disc valve 468 provided between the oil passage 474 communicated with the lower cylinder chamber 452b and the oil passage 475 communicated with the reservoir 456 so that the flow resistance is not generated between the upper and lower cylinder chambers 452a, 452b, a negative pressure due to the flow resistance is not generated in the cylinder 452, with the result that a stable damping force can be obtained and the setting range for the damping force feature can be widened.

As is in the tenth embodiment, since the leaf springs 488, 489 are urged against the seal portions 486, 487 of the seal members 480, 481 under the action of the pressures in the back pressure chambers 490, 491, the sealing ability can be improved. Thus, even in the low piston speed zone where the pressures in the back pressure chambers 490, 491 are small, a reduction in the sealing ability for the back pressure chambers 490, 491 can be positively prevented, thereby generating the stable damping force.

In the tenth and eleventh embodiments, while an example that the back pressure chambers are provided behind the extension side disc valve and the compression side disc valve to permit the adjustment of the valve features of the extension side and of compression side was explained, one of the back pressure chambers may be omitted so that either the extension side valve feature or the compression side valve feature may be adjusted.

What is claimed is:

1. A hydraulic damper of a damping force adjusting type, comprising:

a cylinder containing hydraulic fluid therein;

a piston slidably mounted in said cylinder and dividing the interior of said cylinder into two cylinder chambers;

a piston rod having one end connected to said piston and the other end extending out of said cylinder; and a reservoir connected to said cylinder and adapted to compensate for changes in volume of said cylinder due to extension and retraction of said piston rod by compression or expansion of gas; and a damping force generating mechanism disposed outside of said cylinder comprising:

an extension side passage adapted to make hydraulic fluid flow from one of said cylinder chambers to the other of said cylinder chambers during an extension stroke of said piston rod;

a compression side passage adapted to make hydraulic fluid flow from the other of said cylinder chambers to said reservoir during a compression stroke of said piston rod;

an extension side damping valve for adjusting a flow area of said extension side passage;

an extension side back pressure chamber for applying pressure to a valve body of said extension side damping valve to close said extension side damping valve;

an extension side upstream passage for communicating said extension side back pressure chamber with said cylinder chamber on the upstream side of said extension side damping valve, said upstream passage having means for creating flow resistance;

an extension side downstream passage for communicating said extension side back pressure chamber with said cylinder chamber on the downstream side of said extension side damping valve;

an extension side variable orifice for adjusting a flow area of said extension side downstream passage;

a a compression side damping valve for adjusting a flow area of said compression side passage;

a compression side back pressure chamber for applying pressure to a valve body of said compression side damping valve to close said compression side damping valve;

a compression side upstream passage for communicating said compression side back pressure chamber with said cylinder chamber on the upstream side of said compression side damping valve, said compression side upstream passage having means for creating flow resistance;

a compression side downstream passage for communicating said compression side back pressure chamber with said reservoir on the downstream side of said compression side damping valve; and a compression side variable orifice for adjusting a flow area of said compression side downstream passage.

2. A hydraulic damper according to claim 1, wherein said extension side passage is provided with a check valve for allowing a flow of hydraulic fluid only from the one of said cylinder chambers to the other of said cylinder chambers and said compression side passage is provided with a check valve for allowing a flow of hydraulic fluid only from the other of said cylinder chambers to said reservoir.

3. A hydraulic damper according to claim 1, wherein each of said damping valves is comprised of a disc valve.

4. A hydraulic damper according to claim 3, wherein at least one of said extension side upstream passage and said compression side upstream passage is formed by a fixed orifice formed in said disc valve.

5. A hydraulic damper according to claim 3, wherein at least one of said extension side upstream passage and said compression side upstream passage is formed by a notch provided in a retainer with which the inner periphery of said disc valve engages.

6. A hydraulic damper according to claim 3, wherein at least one of said extension side back pressure chamber and said compression side back pressure chamber is formed by a seal guide member disposed on the back side of said disc valve, a cylindrical seal member slidably mating with said seal guide member and engaging with the back side surface of said disc valve at one end of said seal member, and means for biasing said seal member to said back side surface of said disc valve.

7. A hydraulic damper according to claim 6, wherein said seal member has a flange portion extending inwardly from the inner peripheral portion at one end of said seal member and said biasing means comprises a disc-shaped spring plate engaging with a surface of said flange facing said seal guide member.

8. A hydraulic damper according to claim 1, wherein said extension side and compression side variable orifices are adapted to be varied by an adjusting member in such a manner that when the flow area of one of said variable orifices is increased, the flow area of the other of said variable orifices is decreased, and vice versa, said variable orifices being able to be fully closed when the flow areas thereof are decreased.

9. A hydraulic damper according to claim 1, wherein said extension side and compression side variable orifices are defined by ports formed in a cylindrical guide member for communicating with said extension side and compression side back pressure chambers, respectively, and a shutter rotatably received in said guide member for changing flow areas of said ports.

10. A hydraulic damper according to claim 9, wherein said ports are adapted to be varied depending on the rotational position of said shutter in such a manner that when the flow area of one of said ports is increased, the flow area of the other of said ports is decreased, and vice versa, said ports being able to be fully closed when the flow areas thereof are decreased.

11. A hydraulic damper according to claim 1, wherein said extension side and compression side variable orifices are defined by ports formed in a cylindrical guide member for communicating with said extension side and compression side back pressure chambers, respectively, and a spool slidably received in said guide member for axial reciprocal movement for changing flow areas of said ports.

12. A hydraulic damper according to claim 11, wherein said extension side and compression side ports are adapted to be varied depending on the axial position of said spool in such a manner that when the flow area of one of said ports is increased, the flow area of the other of said ports is decreased, and vice versa, said ports being able to be fully closed when the flow areas thereof are decreased.

13. A hydraulic damper according to claim 12, wherein when said spool is at a limit of axial sliding movement, both of said extension side and compression side ports are in a condition in which the flow areas thereof are minimized.

14. A hydraulic damper according to claim 12, wherein said spool is biased in one direction by a spring, and when said spool is at a limit of axial sliding movement by the effect of said spring, both of said extension side and compression sides are in a condition where the flow areas thereof are minimized.

15. A hydraulic damper according to claim 11, wherein the position of said spool is adjusted by a pilot chamber formed at one end of said spool and a pressure control valve for controlling the pressure in said pilot chamber.

16. A hydraulic damper according to claim 1, wherein an extension side sub-valve is provided in said extension side downstream passage downstream of said extension side variable orifice, said sub-valve being adapted to open upon being subjected to a pressure which is lower than the pressure for opening said extension side damping valve.

17. A hydraulic damper according to claim 16, wherein said sub-valve has an orifice with a flow area which is smaller than that of the portion of said extension side upstream passage, which portion creates said flow resistance.

18. A hydraulic damper according to claim 1, wherein a compression side sub-valve is provided in said downstream passage downstream of said compression side variable orifice, said sub-valve being adapted to open upon being subjected to a pressure which is lower than the pressure for opening said compression side damping valve.

19. A hydraulic damper according to claim 18, wherein said sub-valve has an orifice with a flow area which is smaller than that of the portion of said compression side upstream passage, which portion creates said flow resistance.

* * * * *